US012103786B2

(12) United States Patent
Yasuda

(10) Patent No.: US 12,103,786 B2
(45) Date of Patent: Oct. 1, 2024

(54) CONVEYANCE SYSTEM, CONTROL DEVICE, AND CONTROL METHOD

(71) Applicant: NEC Corporation, Tokyo (JP)

(72) Inventor: Shinya Yasuda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 57 days.

(21) Appl. No.: 17/800,413

(22) PCT Filed: Feb. 28, 2020

(86) PCT No.: PCT/JP2020/008528
§ 371 (c)(1),
(2) Date: Aug. 17, 2022

(87) PCT Pub. No.: WO2021/171618
PCT Pub. Date: Sep. 2, 2021

(65) Prior Publication Data
US 2023/0107626 A1    Apr. 6, 2023

(51) Int. Cl.
*B65G 47/50* (2006.01)
*B65G 61/00* (2006.01)
*B66F 9/06* (2006.01)
*B66F 9/075* (2006.01)

(52) U.S. Cl.
CPC ............. *B65G 47/50* (2013.01); *B66F 9/063* (2013.01); *B66F 9/0755* (2013.01); *B65G 61/00* (2013.01); *B65G 2203/0208* (2013.01); *B65G 2203/0283* (2013.01); *B65G 2203/041* (2013.01)

(58) Field of Classification Search
CPC ............ B65G 47/50; B65G 2203/0208; B65G 2203/0283; B65G 2203/041; B66F 1/0212; B66F 1/0088; B66F 1/0231
See application file for complete search history.

(56) References Cited

U.S. PATENT DOCUMENTS 9,152,149 B1 * 10/2015 Palamarchuk .......... G06F 16/29
10,583,982 B2 * 3/2020 Kimura ................ G05D 1/0227
10,683,171 B2 * 6/2020 Jarvis .................... B65G 1/1375
10,828,834 B2 * 11/2020 Bechmann ............. B22F 10/00
(Continued)

FOREIGN PATENT DOCUMENTS

JP    H01-242392 A    9/1989
JP    2009-539727 A   11/2009
(Continued)

OTHER PUBLICATIONS

International Search Report for PCT Application No. PCT/JP2020/008528, mailed on Jul. 7, 2020.
(Continued)

*Primary Examiner* — James R Bidwell
(74) *Attorney, Agent, or Firm* — Sughrue Mion, PLLC

(57) ABSTRACT

A conveyance system including a conveying vehicle configured to convey a conveying object, a sensor configured to acquire the information relating to the conveying object, and a control device configured to control the conveying vehicle is designed to identify a contact position at which the conveying vehicle comes in contact with the conveying object when conveying the conveying object based on the information relating to the conveying object, and to control the conveying vehicle according to the contact position.

12 Claims, 14 Drawing Sheets

(56) References Cited

U.S. PATENT DOCUMENTS

| | | | |
|---|---|---|---|
| 2007/0288123 A1 | 12/2007 | D'Andrea et al. | |
| 2016/0288324 A1* | 10/2016 | Bradski | G06T 17/00 |
| 2021/0004009 A1* | 1/2021 | Furihata | G05D 1/0212 |
| 2021/0198041 A1* | 7/2021 | Austrheim | B65G 1/0492 |
| 2022/0297992 A1* | 9/2022 | Sonoura | G01S 17/931 |
| 2022/0350319 A1 | 11/2022 | Yoshida et al. | |

FOREIGN PATENT DOCUMENTS

| | | |
|---|---|---|
| JP | 2011-022700 A | 2/2011 |
| JP | 2011-108003 A | 6/2011 |
| JP | 2014-144836 A | 8/2014 |
| JP | 2018-092393 A | 6/2018 |
| WO | 2020/022479 A1 | 1/2020 |

OTHER PUBLICATIONS

JP Official Communication for JP Application No. 2023-188751, mailed on Jul. 30, 2024 with English Translation.

* cited by examiner

CONVEYANCE SYSTEM, CONTROL DEVICE, AND CONTROL METHOD

This application is a National Stage Entry of PCT/JP2020/008528 filed on Feb. 28, 2020, the contents of all of which are incorporated herein by reference, in their entirety.

TECHNICAL FIELD

The present invention relates to a conveyance system, a control device, and a control method.

BACKGROUND ART

Robots have been frequently used for the purpose of conveying objects. Patent Document 1 discloses a technology of a conveyance system for conveying objects using robots.

Patent Document 1 discloses an example of algorithms for efficiently and stably implementing robot-push conveyance. Patent Document 1 discloses a technology of controlling a robot in its moving direction.

CITATION LIST

Patent Literature Document

Patent Document 1: Japanese Patent Application Publication No. 2011-108003

SUMMARY OF INVENTION

Technical Problem

Incidentally, it is necessary to identify the position at which a conveying vehicle in an attempt to convey objects comes in contact with objects when conveying objects.

For this reason, the present invention aims to provide a conveyance system, a control device, and a control method which can solve the aforementioned problem.

Solution to Problem

In a first aspect of the present invention, a conveyance system includes a conveying vehicle configured to convey a conveying object, a sensor configured to acquire the information relating to the conveying object, and a control device configured to control the conveying vehicle, wherein the conveyance system is designed to identify a contact position at which the conveying vehicle comes in contact with the conveying object when conveying the conveying object based on the information relating to the conveying object, and to control the conveying vehicle according to the contact position.

In a second aspect of the present invention, a control device is configured to communicate with a conveying vehicle configured to convey a conveying object and a sensor configured to acquire the information relating to the conveying object, to identify a contact position at which the conveying vehicle comes in contact with the conveying object when conveying the conveying object based on the information relating to the conveying object, and to control the conveying vehicle according to the contact position.

In a third aspect of the present invention, a control method includes: communicating with a conveying vehicle configured to convey a conveying object and a sensor configured to acquire the information relating to the conveying object; identifying a contact position at which the conveying vehicle comes in contact with the conveying object when conveying the conveying object based on the information relating to the conveying object; and controlling the conveying vehicle according to the contact position.

Advantageous Effects of Invention

According to the present invention, it is possible to identify the position at which a conveying vehicle in an attempt to convey objects comes in contact with objects.

DESCRIPTION OF EXEMPLARY EMBODIMENTS

Hereinafter, a conveyance system according to the first exemplary embodiment of the present invention will be described with reference to the accompanying drawings.

Figure 1:
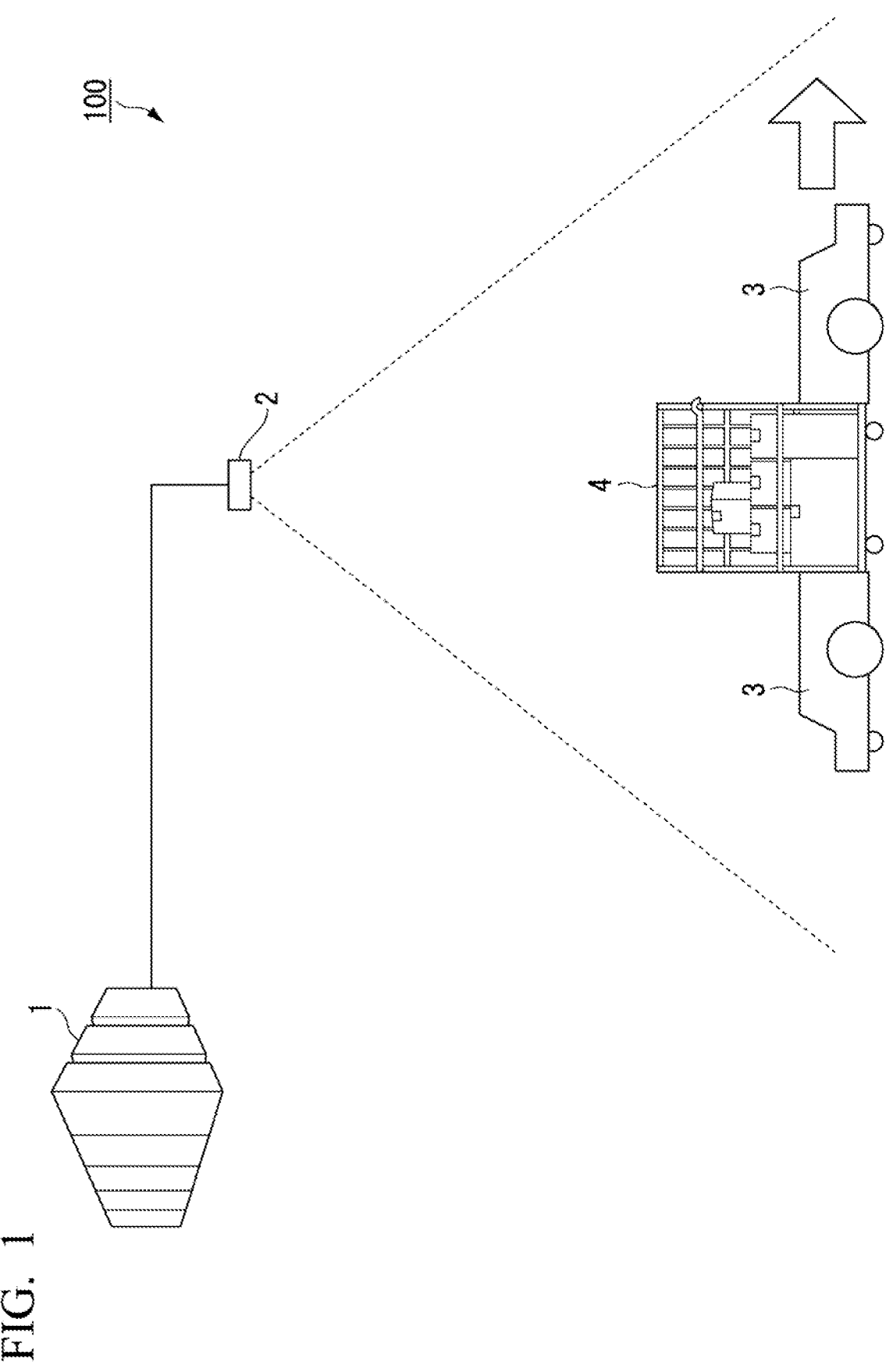
FIG. 1 is a schematic illustration of a conveyance system according to the first exemplary embodiment of the present invention.

FIG. 1 is a schematic illustration of a conveyance system according to the present exemplary embodiment.

As shown in FIG. 1, a conveyance system 100 includes a control device 1, a sensor 2, and a conveying vehicle 3.

The sensor 2 is configured to measure the information relating to a conveying object 4. The sensor 2 transmits the measured information relating to the conveying object 4 to the control device 1. Specifically, the sensor 2 is an imaging device to capture an image in a field in which the conveying vehicle 3 can move around. For example, the sensor 2 is a depth camera or a stereo camera. The sensor 2 is configured to capture an image around a floor surface on which the conveying vehicle 3 can travel. According to the present exemplary embodiment, the sensor 2 is configured to measure distance information and image information of a circumscription about a downward axis extended from the vicinity of a ceiling for attaching the sensor 2 to the floor surface. That is, the sensor 2 is configured to generate the image information representing an image captured in the measurement range of the sensor 2 and the distance information representing a distance toward each position in the measurement range of the sensor 2. For example, the distance information represents a distance from the sensor 2 with respect to each pixel in the image information of the measurement range.

The control device 1 is configured to control the conveying vehicle 3. The control device 1 controls the conveying vehicle 3 based on the acquired information. The control device 1 communicates with the sensor 2 for measuring the conveying object 4 and the conveying vehicle 3. The control device 1 is configured to acquire the image information and the distance information from the sensor 2. The control device 1 is configured to identify the position at which the conveying vehicle 3 comes in contact with the conveying object 4 when conveying the conveying object 4, thus controlling the conveying vehicle 3 according to the contact position. In this connection, the control device 1 may control a single conveying vehicle 3 or a plurality of conveying vehicles 3. The conveying vehicle 3 serves as one embodiment of robots.

Figure 2:
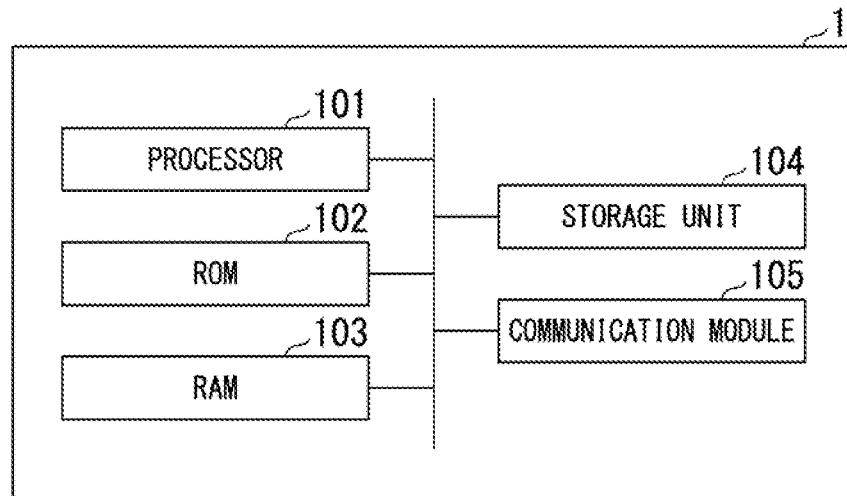
FIG. 2 is a hardware configuration diagram of a control device according to the first exemplary embodiment of the present invention.

FIG. 2 is a hardware configuration diagram of a control device according to the present exemplary embodiment.

As shown in FIG. 2, the control device 1 is a computer server including various hardware elements such as a processor 101, a ROM (Read-Only Memory) 102, a RAM (Random-Access Memory) 103, a storage unit 104, and a communication module 105.

For example, the processor 101 is a CPU (Central Processing Unit), a GPU (Graphics Processing Unit), or the like. For example, the storage unit 104 is a HDD (Hard-Disk Drive), a SSD (Solid-State Drive), a memory card, or the like. In addition, the storage unit 104 may be memory such as RAM and ROM. The communication module 105 is configured to transmit data or receive data from external devices. For example, the communication module 105 communicates with external devices through wired communication paths or wireless communication paths.

Figure 3:
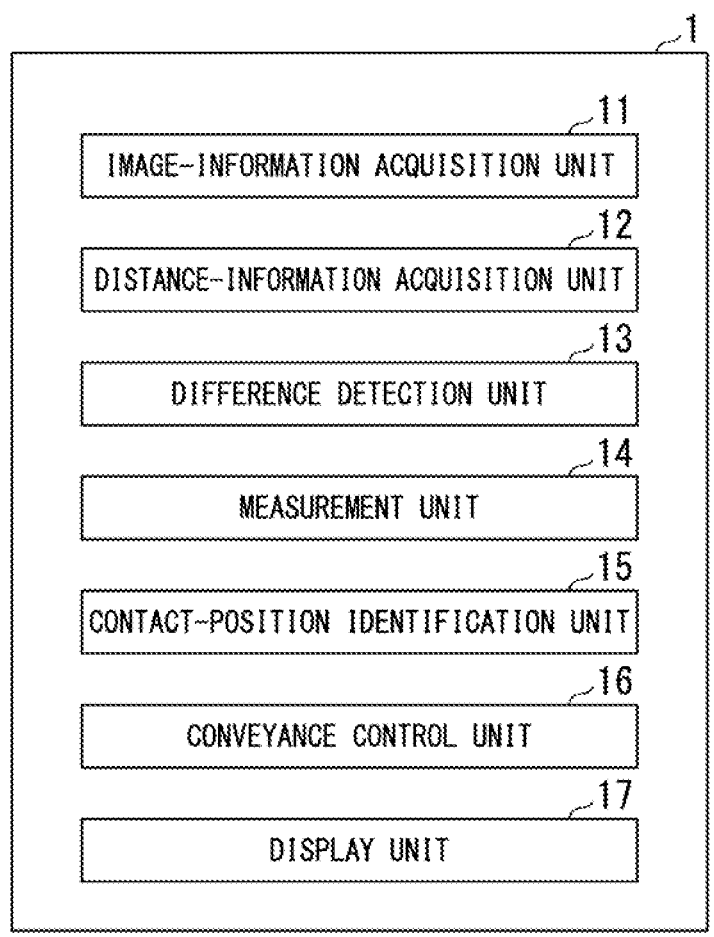
FIG. 3 is a functional block diagram of the control device according to the first exemplary embodiment of the present invention.

FIG. 3 is a functional block diagram of a control device according to the present exemplary embodiment.

The control device 1 is activated upon being powered on to execute control programs stored in advance. Accordingly, the control device 1 may demonstrate various functions such as an image-information acquisition unit 11, a distance-information acquisition unit 12, a difference detection unit 13, a measurement unit 14, a contact-position identification unit 15, a conveyance control unit 16, and a display unit 17.

The conveying object 4 is a target object subjected to conveyance, an example of which would be a cart or a bogie carrying loads. Under the control of the control device 1, the conveying vehicle 3 can convey the conveying object 4. Upon receiving from the control device 1 the information of a contact position representing the position at which the conveying vehicle 3 comes in contact with the conveying object 4, the conveying vehicle 3 can convey the conveying object 4 by pushing or dragging it towards the contact position.

When the sensor 2 captures an image of the conveying object 4 in a direction from the upper side to the lower side, it is possible to mention two instances depending on the positional relationship between the sensor 2 and the conveying object 4, e.g., an instance of the captured image including the side face(s) of the conveying object 4 and another instance of the captured image precluding the side face(s) of the conveying object 4. When the conveying object 4 is located in proximity to the center of the measurement range of the sensor 2, for example, the upper face of the conveying object 4 may be reflected in the captured image but the side face(s) thereof may not be reflected in the captured image. On the other hand, when the conveying object 4 is located at a remote place apart from the center of the measurement range of the sensor 2, both the upper face and the side face(s) of the conveying object 4 may be reflected in the captured image since the sensor 2 should capture the image of the conveying object 2 from the upper side. That is, when the control device 1 detects a certain region of the captured image reflecting the conveying object 4 by using the captured image, it is possible to mention two instances depending on the position of the conveying object 4, e.g., an instance of the region including the side face(s) of the conveying object 4 and another instance of the region precluding the side face(s) of the conveying object 4. In this connection, the conveying object 4 is reflected in the captured image such that the upper-face region thereof will be enlarged in the captured image as the sensor 4 is positioned closer to the conveying object 4. Therefore, even when the entire region of the conveying object 4 reflected in the captured image would be differentiated according to the height of the conveying object 4 (i.e., the distance from the sensor 2) and the positional relationship between the sensor 2 and the conveying object 4, the control device 1 needs to accurately calculate the contact position at the predetermined height at which the conveying vehicle 3 comes in contact with the conveying object 4.

Figure 4:
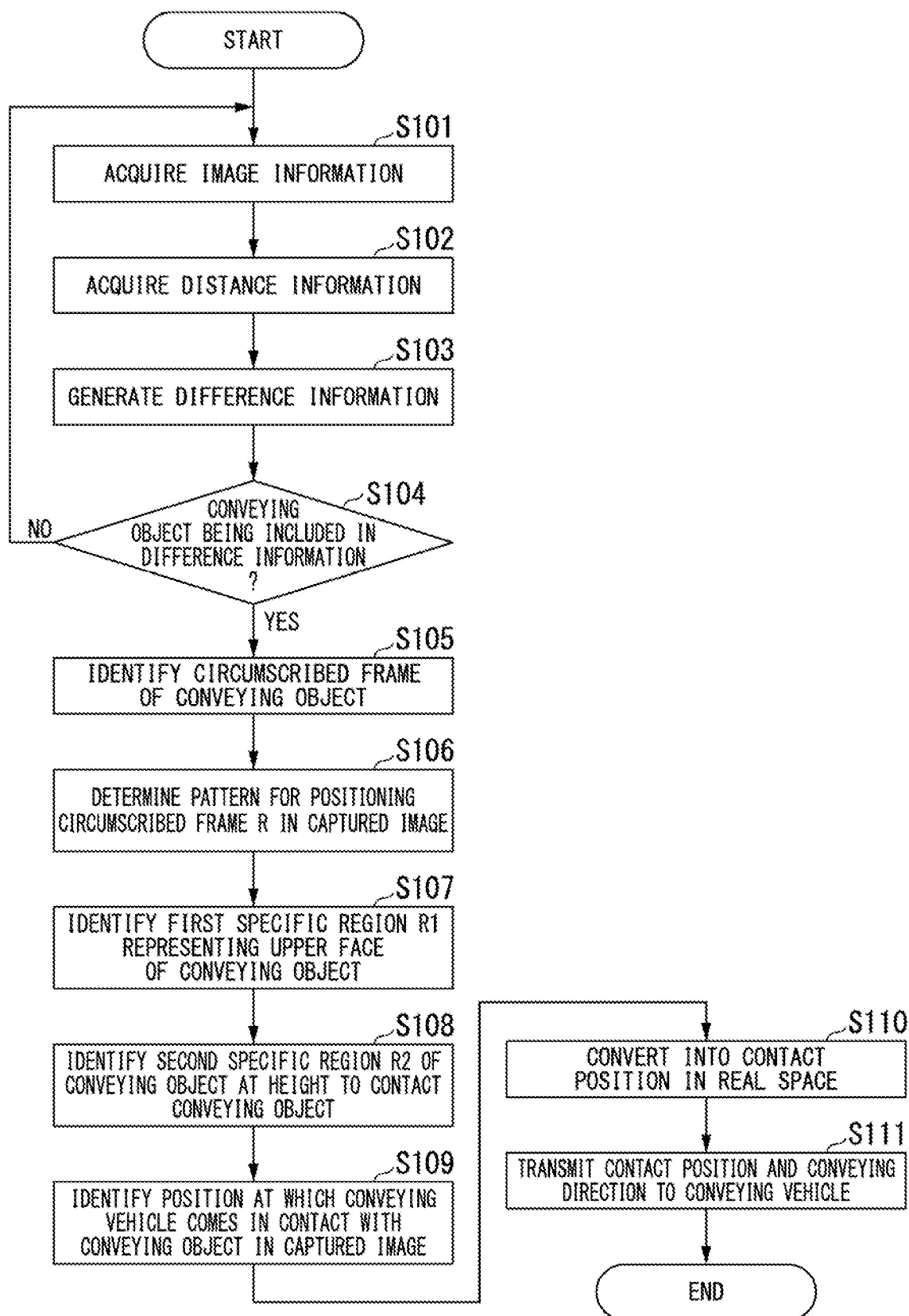
FIG. 4 is a flowchart showing a flow of processes to be implemented by the conveyance system according to the first exemplary embodiment of the present invention.

FIG. 4 is a flowchart showing a flow of processes to be implemented by the conveyance system according to the present exemplary embodiment.

Next, a flow of processes to be implemented by the conveyance system 100 will be described in succession.

First, the sensor 2 transmits to the control device 1 a certain number of image information such as thirty frames per second. In addition, the sensor 2 transmits to the control device 1 a certain number of distance information such as thirty frames per second. In the sensor 2, the timing to transmit the image information is assumed to match the timing to transmit the distance information. In this connection, both the image information and the distance information relate to the same region of the captured image.

The image-information acquisition unit 11 of the control device 1 acquires the image information (step S101). The distance-information acquisition unit 12 of the control device 1 acquires the distance information (step S102).

The image-information acquisition unit 11 generates a background image based on the image information so as to record the background image on a storage unit such as the RAM 103. Herein, generation and recording of the background image can be performed before detection of the conveying object 4. For example, the image-information acquisition unit 11 may generate and record the background image when the conveyance system 100 starts its operation or when a manager of the conveyance system 100 instructs recording of the background image. In this connection, the background image is derived from the image information corresponding to the measurement range precluding the conveying vehicle 3, the conveying object 4, and other foreign matters. When the storage unit stores the background image, the image-information acquisition unit 11 outputs to the difference detection unit 13 the image information received from the sensor 2. The distance-information acquisition unit 12 records the distance information received from the sensor 2 on the storage unit such as the RAM 103. In this connection, the image-information acquisition unit 11 and the distance-information acquisition unit 12 may assign IDs to the image information and the distance information in order to establish an association between the image information and the distance information which are correspondingly adjusted at the transmission timing.

The difference detection unit 13 generates the difference information representing a difference between the background image and the image information received from the image-information acquisition unit 11. Specifically, upon receiving the image information, the difference detection unit 13 compares the image information with the background image. The difference detection unit 13 generates the difference information representing a region causing any variances between the image information and the background image (step S103). For example, the image information and the background image may be binarized to pixels each having "0" or "1" based on the brightness for each pixel, wherein the difference detection unit 13 generates the difference information representing a difference for each pixel between the binarized image information and the binarized background image. In the difference information, a pixel having a difference represented by "1" indicates that some object is disposed in the measurement range. The difference detection unit 13 outputs the difference information to the measurement unit 14.

The measurement unit 14 determines whether the acquired difference information includes the conveying object 4 (step S104). For example, the measurement unit 14 determines whether the conveying vehicle 3 is disposed in the measurement range, and then the measurement unit 14 determines that the measurement range includes the conveying object 4 when the difference information includes information other than the conveying vehicle 3.

The conveying vehicle 3 may detect the position information thereof so as to transmit the position information to the control device 1, or the sensor 2 may detect the position information of the conveying vehicle 3 so as to transmit the position information to the control device 1. The measurement unit 14 determines whether the conveying vehicle 3 is disposed in the measurement range by way of comparison between the position information of the conveying vehicle 3 and the position information of the measurement range which is measured by the sensor 2 and stored in advance.

The measurement unit 14 may detect the position of the conveying vehicle 3 from the image information using characteristics of the conveying vehicle 3 (brightness, size, etc.) which are stored in advance, thus determining whether the conveying vehicle 3 is disposed in the measurement range. In this connection, the methodology for the measurement unit 14 to detect the position of the conveying vehicle 3 is not necessarily limited to the aforementioned method.

When the conveying vehicle 3 is disposed in the measurement range, the measurement unit 14 may generate the difference information by masking the region of the conveying vehicle 3 in the measurement range indicated by the difference information.

In the above, the measurement unit 14 determines whether the conveying vehicle 3 is disposed in the measurement range and determines whether the conveying object 4 is included in the measurement range when the difference information acquired from the difference detection unit 13 includes information other than the information of the conveying vehicle 3, however, the methodology how to determine whether the measurement range includes the conveying object 4 is not necessarily limited to the aforementioned method.

For example, the measurement unit 14 may determine whether the difference information includes the conveying vehicle 4 based on the information representative of the prescribed size of the conveying object 4 even when the conveying vehicle 3 and the conveying object 4 are included in the measurement range.

The measurement unit 14 determines an encompassing region for encompassing the conveying object 4. For example, the measurement unit 14 determines the size of a region grouping pixels representing the existence of a difference in the difference information. The measurement unit 14 determines a circumscribed frame R of the conveying object 4 representing a circumscribed frame of a region grouping pixels each indicating a difference "1" in the difference information when the region has a certain size or more (step S105). The circumscribed frame R indicates a frame of an encompassing region for encompassing the upper face and the side face(s) of the conveying object 4 serving as a measurement target. In this connection, the methodology of determining the circumscribed frame R is not necessarily limited to the aforementioned method; hence, the measurement unit 14 may employ another method to determine the circumscribed frame R representative of the region of the conveying object 4 included in the difference information.

Figure 5:
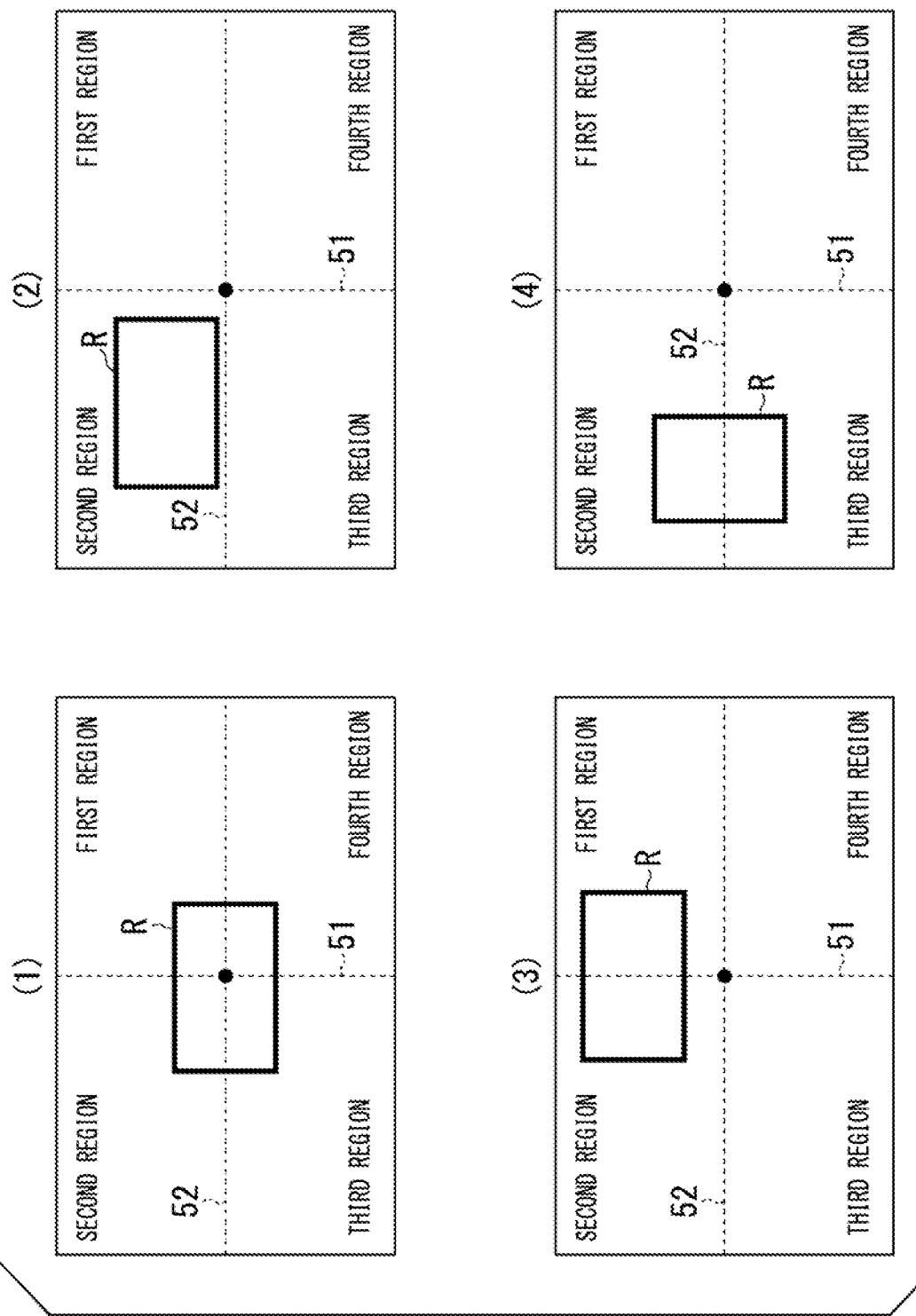
FIG. 5 includes schematic figures showing patterns for detecting the position of a circumscribed frame R according to the first exemplary embodiment of the present invention.

FIG. 5 includes schematic figures showing patterns for detecting the position of the circumscribed frame R in the measurement range.

The present exemplary embodiment is designed to determine whether the pattern for detecting the position of the circumscribed frame R, which is detected by the measurement unit 14, in the captured image corresponds to any one among a first pattern through a third pattern (step S106). In the following descriptions, the measurement range of the sensor 2 is partitioned by a vertical line 51 and a horizontal line 52 passing through the center of the measurement range, thus realizing an upper-right partition as a first region, an upper-left partition as a second region, a lower-left partition as a third region, and a lower-right partition as a fourth region.

FIG. 5(1) shows a first pattern for positioning the circumscribed frame R. The first pattern shows the circumscribed frame R whose four vertices are included in the first region through fourth regions, respectively. The first pattern may appear when the circumscribed frame R including the conveying object 4 is positioned at the center of the measurement range.

FIG. 5(2) shows a second pattern for positioning the circumscribed frame R. The second pattern shows the circumscribed frame R whose four vertices are collectively included in one region among the first region through the fourth region. The second pattern may appear when the circumscribed frame R including the conveying object 4 appears solely in any one region among the first region through the fourth region.

FIGS. 5(3) and FIG. 5(4) show a third pattern for positioning the circumscribed frame R. The third pattern shows the circumscribed frame R whose four vertices are disposed over two regions. The third pattern shown in FIG. 5(3) may cover an instance in which the circumscribed frame R including the conveying object 4 extends over the first region and the second region and another instance in which the circumscribed region R extends over the third region and the fourth region. The third pattern shown in FIG. 5(4) may cover an instance in which the circumscribed frame R including the conveying object 4 extends over the second region and the third region and another instance in which the circumscribed frame R extends over the first region and the fourth region.

Figure 6:
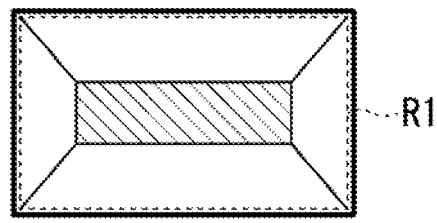
FIG. 6 includes a schematic figure showing an imaged state of a conveying object according to a first pattern for positioning the circumscribed frame R according to the first exemplary embodiment of the present invention.

FIG. 6 includes a schematic figure showing an imaged state of a conveying object according to the first pattern for positioning the circumscribed frame R.

When the measurement unit 14 detects the position of the circumscribed frame R according to the first pattern, the upper face of the conveying object 4 is reflected in the captured image but the side face(s) thereof may not be reflected in the captured image. In addition, the upper-face region of the conveying object 4 will be enlarged in the captured image as the sensor is positioned closer to the upper face of the conveying object 4.

Figure 7:
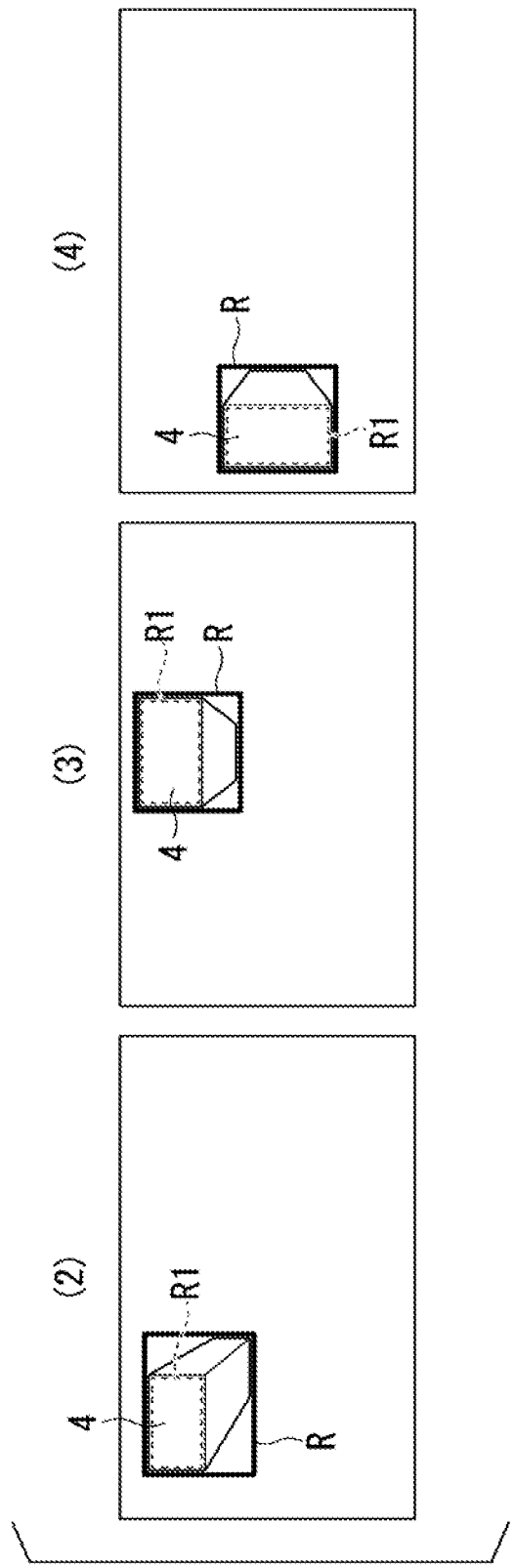
FIG. 7 includes schematic figures showing imaged states of the circumscribed frame R according to the first exemplary embodiment of the present invention.

FIG. 7 includes schematic figures showing imaged states of conveying objects according to the second pattern or the third pattern for positioning the circumscribed frame R.

When the measurement unit 14 detects the position of the circumscribed frame R according to the second pattern, as shown in FIG. 7(2), the captured image may reflect the upper face of the conveying object 4 and the other face(s) of the conveying object 4 which can be concatenated to the position of the sensor 2 by straight lines. When the measurement unit 14 detects the position of the circumscribed frame R according to the third pattern, the captured image may reflect various faces of the conveying object 4 as shown in FIGS. 7(3) and FIG. 7(4).

The measurement unit 14 determines the first pattern when coordinates of pixels within the limit of the circumscribed frame R spread over all the four regions, i.e., the first region through the fourth region which are partitioned by a vertical line and a horizontal line passing through the center of the measurement range. The measurement unit 14 determines the second pattern when all the coordinates of pixels within the limit of the circumscribed frame R spread across a single region alone among four regions, i.e., the first region through the fourth region which are partitioned by a vertical line and a horizontal line passing through the center of the measurement range. The measurement unit 14 determines the third pattern when coordinates of pixels within the limit of the circumscribed frame R spread across two regions which are partitioned by a vertical line 51 passing through the center of the measurement region or when coordinates of pixels within the limit of the circumscribed frame R spread across two regions which are partitioned by a horizontal line 52 passing through the center of the measurement range.

The measurement unit 14 determines a first specific region R1 representing the upper face of the conveying object 4 in the captured image (step S107). Specifically, the measurement unit 14 calculates a plurality of corresponding points constituting a certain face of an object at a predetermined height according to the relationship between a plurality of feature points, which may appear in the captured image relating to multiple circumscribed frames R to be identified for each circumscribed frame R, and the height information representing the heights of feature points of multiple circumscribed frames R as well as the relationship between a plurality of corresponding points, which may match coordinates in a horizontal direction (or a horizontal position) for aligning feature points of the circumscribed frame R and which may appear in the captured image at a predetermined height having different coordinates of heights, and the height information representing the predetermined height. In this connection, a plurality of corresponding points constituting a certain face of an object at a predetermined height may include a number of estimated corresponding points which may not appear in the captured image. The measurement unit 14 determines the first specific region R1 representing the upper face of the conveying object 4 in the captured image according to a plurality of corresponding points.

Based on the first specific region R1, the measurement unit 14 determines a second specific region R2 representing a region of the conveying object 4 in the captured image at the height at which the conveying vehicle 3 comes in contact with the conveying object 4 (step S108).

The contact-position identification unit 15 acquires the information of the second specific region R2 representing the region of the conveying object 4 in the captured image at a height h' at which the conveying vehicle 3 comes in contact with the conveying object 4. The contact-position identification unit 15 acquires the information representative of feature points indicated by the second specific region R2. Based on the information of feature points indicated by the second specific region R2, the contact-position identification unit 15 identifies the position at which the conveying vehicle 3 comes in contact with the conveying object 4 in the captured image (step S109).

Figure 8:
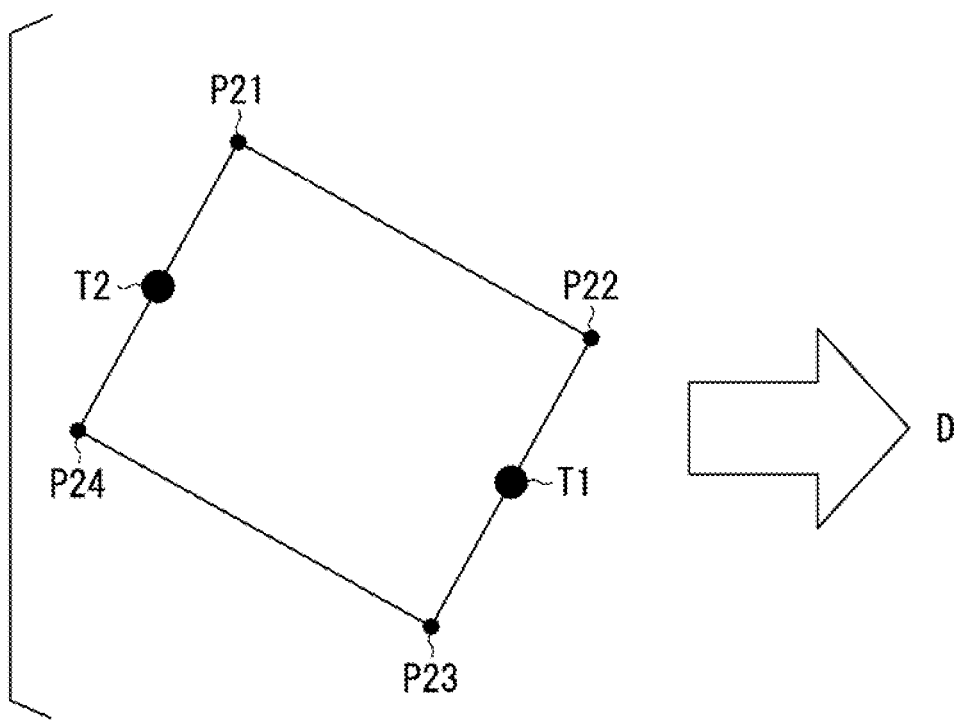
FIG. 8 is a schematic figure showing an outline of identifying a contact position according to the first exemplary embodiment of the present invention.

FIG. 8 is a schematic figure showing an outline of identifying a contact position.

Assuming that the second specific region R2 has a rectangular shape defined by feature points P21, P22, P23, and P24, for example, the contact-position identification unit 15 determines the center of any one side of the second specific region R2 as a contact position T1 at which the conveying vehicle 3 comes in contact with the conveying object 4 in the captured image. For example, the contact-position identification unit 15 determines a first side connected between the feature points P21 and P22 in a conveying direction D and a second side connected between the feature points P22 and P23, wherein the contact-position identification unit 15 identifies the center of the second side, which has a normal line forming a smaller angle with the conveying direction D within two normal lines applied to the first and second sides, as the contact position T1 at which the conveying vehicle 3 comes in contact with the conveying object 4 in the captured image. The contact-position identification unit 15 outputs the contact position T1 to the conveyance control unit 16. For example, the conveying vehicle 3 comes in contact with the conveying object 4 at the contact position T1 so as to draw the conveying object 4 in the conveying direction D.

The contact-position identification unit 15 may identify a center T2 of a side of the second specific region R2, which has a normal line forming a smaller angle with the conveying direction D within adjacent sides of the second specific region R2 directed opposite to the conveying direction D, as the contact position P at which the conveying vehicle 3 comes in contact with the conveying object 4 in the captured image. That is, the contact-position identification unit 15 determines two sides laid oppositely to the conveying direction D, i.e., a third side connected between the feature points P21 and P24 and a fourth side connected between the feature points P24 and P23, wherein the contact-position identification unit 15 identifies the center of the third side having a normal line forming a smaller angle with the conveying direction D within two sides as the contact position T2 at which the conveying vehicle 3 comes in contact with the conveying object 4 in the captured image. The contact-position identification unit 15 outputs the contact position T2 to the conveyance control unit 16. In this case, the conveying vehicle 3 comes in contact with the conveying object 4 at the contact position T2 so as to travels forwards while pushing the conveying object 4 in the conveying direction D.

The conveyance control unit 16 converts the contact positions T1, T2 in the captured image into contact positions T1', T2' in the real space (step S110). For example, the conveyance control unit 16 stores in advance the corresponding relationship between coordinates in the virtual space indicated by the captured image and coordinates in the real space, and therefore the conveyance control unit 16 converts the contact positions T1, T2 into the contact positions T1', T2' in the real space according to the corresponding relationship.

The conveyance control unit 16 transmits to the conveying vehicle 3 the contact positions T1', T2' in the real space and the conveying direction of the conveying object 4 (step S111). The conveying vehicle 3 moves towards the contact positions T1', T2' and then comes in contact with the contact positions T1', T2', thus conveying the conveying object 4 in the conveying direction.

The above descriptions refer to two conveying vehicles 3 to convey the conveying object 4, whereas a plurality of conveying vehicles 3 may communicate with the conveyance system 100 to convey the conveying object 4, or a single conveying vehicle 3 may communicate with the conveyance system 100 to convey the conveying object 4. For example, four conveying vehicles 3 may come in contact with the conveying object 4 in four ways to convey the conveying object 4, or a single conveying vehicle 3 may come in contact with any one face of the conveying object 4 to convey the conveying object 4 by drawing or pushing the conveying object 4. Using an example of FIG. 8 for the sake of explanation, for example, the conveyance control unit 16 may transmit the contact position T1 to a first conveying vehicle 3 while transmitting the contact position T3 to a second conveying vehicle 3. The first conveying vehicle 3 comes in contact with the contact position T1 of the conveying object 4. The second conveying vehicle 3 comes in contact with the contact position T2 of the conveying object 4. The first conveying vehicle 3 and the second conveying vehicle 3 sandwiches the conveying object 4 therebetween so as to convey the conveying object 4 in the conveying direction.

The aforementioned descriptions refer to the conveying vehicle 3 which comes in contact with the conveying object 4; however, this does not necessarily limit a methodology for the conveying vehicle 3 to affect the conveying object 4. For example, the conveying vehicle 3 may press its instrument against the conveying object 4; the conveying vehicle 3 may connect, press (or engage) its instrument with a recess or a projection formed in the conveying object 4; the conveying vehicle 3 may receive a strong impact from the conveying object 4. Alternatively, the conveying vehicle 3 may hold and draw the conveying object 4 with an instrument to hold the conveying object 4 bidirectionally.

When the first conveying vehicle 3 and the second conveying vehicle 3 come in contact with the conveying object 4 to convey the conveying object 4, for example, the second conveying vehicle 3 may move in its moving direction with a first force F1 applied to the contact position T2. The first conveying vehicle 3 may move in the conveying direction at the same speed as the second conveying vehicle 3 with a second force F2, smaller than the first force F1, applied to the contact position T1. Thus, it is possible to convey the conveying object 4 with two vehicles, i.e., the first conveying vehicle 3 and the second conveying vehicle 3. In addition, for example, the first conveying vehicle 3 comes in contact with the contact position T1 to draw the conveying object 4 but the second conveying vehicle 3 may move in the conveying direction while controlling the conveying object 4 not to drift by applying force to the contact position T2. Alternatively, the second conveying vehicle 3 may come in contact with the contact position T2 so as to move forwards while pushing the conveying object 4 in the conveying direction but the first conveying vehicle 3 may move in the conveying direction while controlling the conveying object 4 not to drift by applying force to the contact position T1.

According to the aforementioned processing of the conveyance system, it is possible to identify a contact position at which a conveying vehicle comes in contact with a conveying object. According to the aforementioned processing of the conveyance system, it is possible to identify more accurately a contact position at which a conveying vehicle comes in contact with a conveying object. According to the aforementioned processing of the conveyance system 100, it is possible to calculate more accurately a contact position at a prescribed height at which the conveying vehicle 3 can come in contact with the conveying object 4 irrespective of different regions to be detected with respect to the conveying object 4 reflected in the captured image according to the height of the conveying object 4 (or a distance from the sensor 2) or the positional relationship between the conveying object 4 and the sensor 2.

Figure 9:
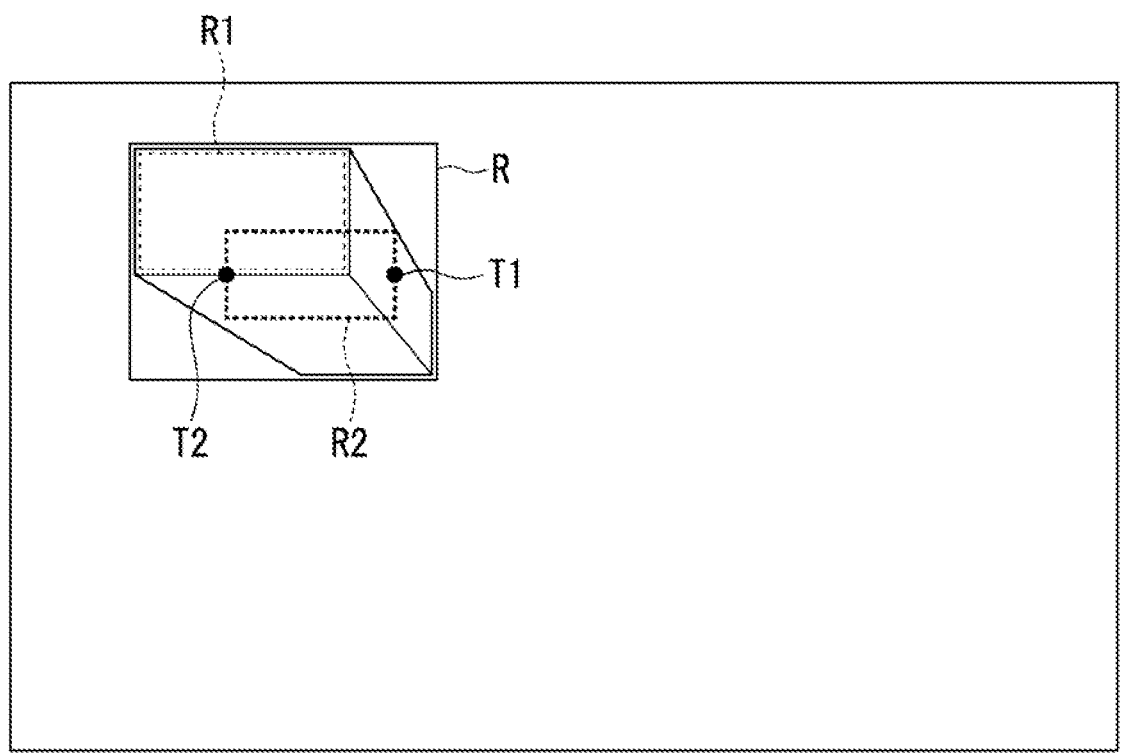
FIG. 9 is a schematic figure showing an example of display information according to the first exemplary embodiment of the present invention.

FIG. 9 shows an example of display information.

The display unit 17 outputs the information identified by the control device 1 to a predetermined destination. For example, the display unit 17 acquires the captured image subjected to processing as well as the circumscribed frame R, the first specific region R1, and the second specific region R2 from the measurement unit 14. In addition, the display unit 17 acquires the contact position which is calculated based on the second specific region R2. The display unit 17 generates the display information to display the circumscribed frame R, the first specific region R1, the second specific region R2, and the contact position. The display unit 17 outputs the display information to the predetermined destination. For example, the display unit 17 outputs the display information to an LCD (Liquid Crystal Display), a CRT (Cathode Ray Tube) display, or monitor installed in the control device 1 as well as a terminal configured to communicate with the control device 1. Accordingly, a manager or the like can confirm the currently-controlled state of the conveyance system. In this connection, the display unit 17 may generate the display information to overlay the circumscribed frame R, the first specific region R1, the second specific region R2, and the contact position, the display information to individually display those pieces of information, or the display information to overlay arbitrary pieces of information selected by an operator who engages in working.

The process of the measurement unit 14 to calculate first and second specific regions will be described in detail.

(Process of Measurement Unit 14 in First Pattern)

Upon determining the first pattern for positioning the circumscribed frame R of the conveying object 4, the measurement unit 14 determines that the circumscribed frame R corresponds to the upper face of the conveying object 4. Based on the circumscribed frame R and its height, the measurement unit 14 identifies a specific region (e.g., the first or second specific region) at a predetermined height of the conveying object 4 included in the region of the circumscribed frame R.

Figure 10:
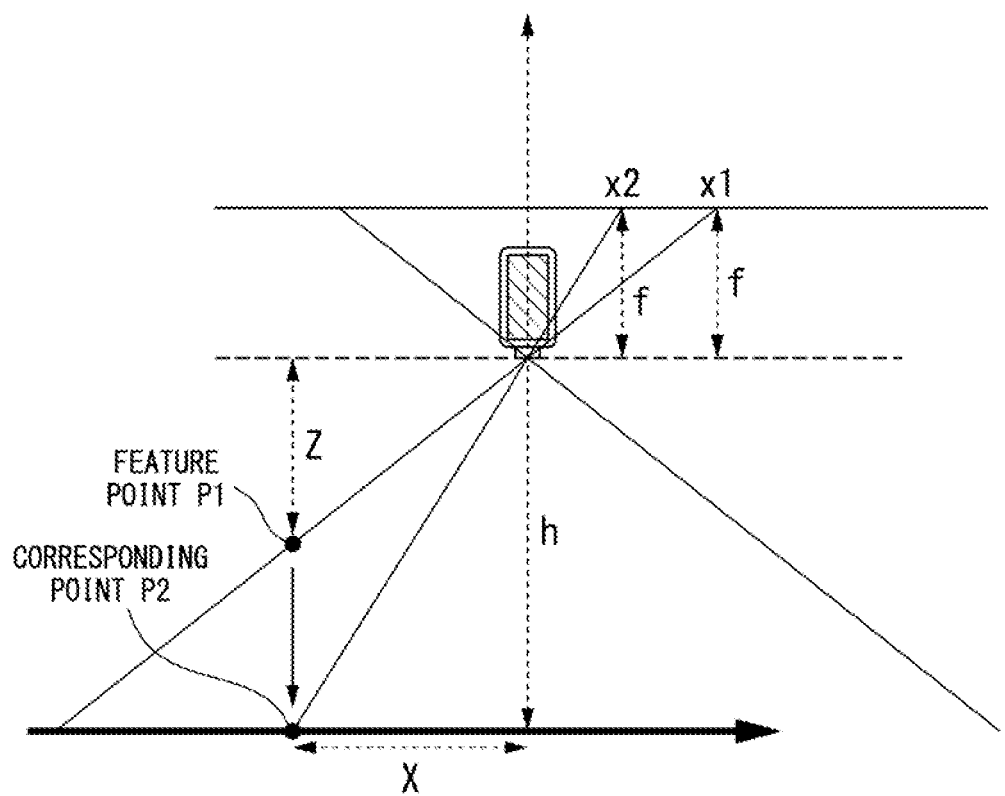
FIG. 10 is a schematic figure showing an outline of calculating the position of a conveying object at a predetermined height according to the first exemplary embodiment of the present invention.

FIG. 10 is a schematic figure showing an outline of calculating the position of a conveying object at a predetermined height.

FIG. 10 shows focal distances f for the sensor 2 to capture image information, an arbitrary feature point P1 on the upper face of the conveying object 4 in the real space, a corresponding point P2 of the conveying object 4 in the real space with a same horizontal-direction coordinate X as the feature point P1, a point x1 diagonal to the feature point P1 in the captured image, and a point x2 diagonal to the corresponding point P2 in the captured image. In the real space, a symbol z denotes a distance of the feature point P1 measured from the sensor 2 in the height direction; a symbol h denotes a distance of the corresponding point P2 measured from the sensor 2 in the height direction; a symbol X denotes a distance of the feature point P1 and the corresponding point P2 measured from the sensor 2 in the horizontal direction. In this case, it is possible to use two formulae, i.e., Expression (1) and Expression (2) according to the relationship between the height-direction distance and the horizontal-direction distance from the sensor 2 in the real space and the relationship between the focal distance of the captured image and the horizontal-direction distance for each point measured from the center point of the captured image.

$$x1/f = X/z \quad (1)$$

$$x2/f = X/h \quad (2)$$

The aforementioned Equation (1) and Equation (2) can be modified as follows.

$$X \cdot f = z \cdot x1 \quad (3)$$

$$X \cdot f = h \cdot x2 \quad (4)$$

In the above, Expression (3) and Expression (4) can be obtained.

$$z \cdot x1 = h \cdot x2 \quad (5)$$

Thus, it is possible to introduce Expression (5). It is possible for the sensor 2 to obtain the point x1 diagonal to the feature point P1 on the upper face of a conveying object in its captured image as well as the distance z and the height h in the real space. Therefore, it is possible to calculate the point x2 in the captured image diagonal to the arbitrary corresponding point P2 in the real space according to Expression (5). In this connection, it is possible for the sensor 2 to measure the value of the height h at an arbitrary timing, or it is possible to set the value of the height h as an initial value when setting up the sensor 2; however, the methodology of acquiring the value of the height h is not necessarily limited to specific methods. In each expression, the symbol "/" denotes division. In each expression, the symbol "·" denotes multiplication.

Figure 11:
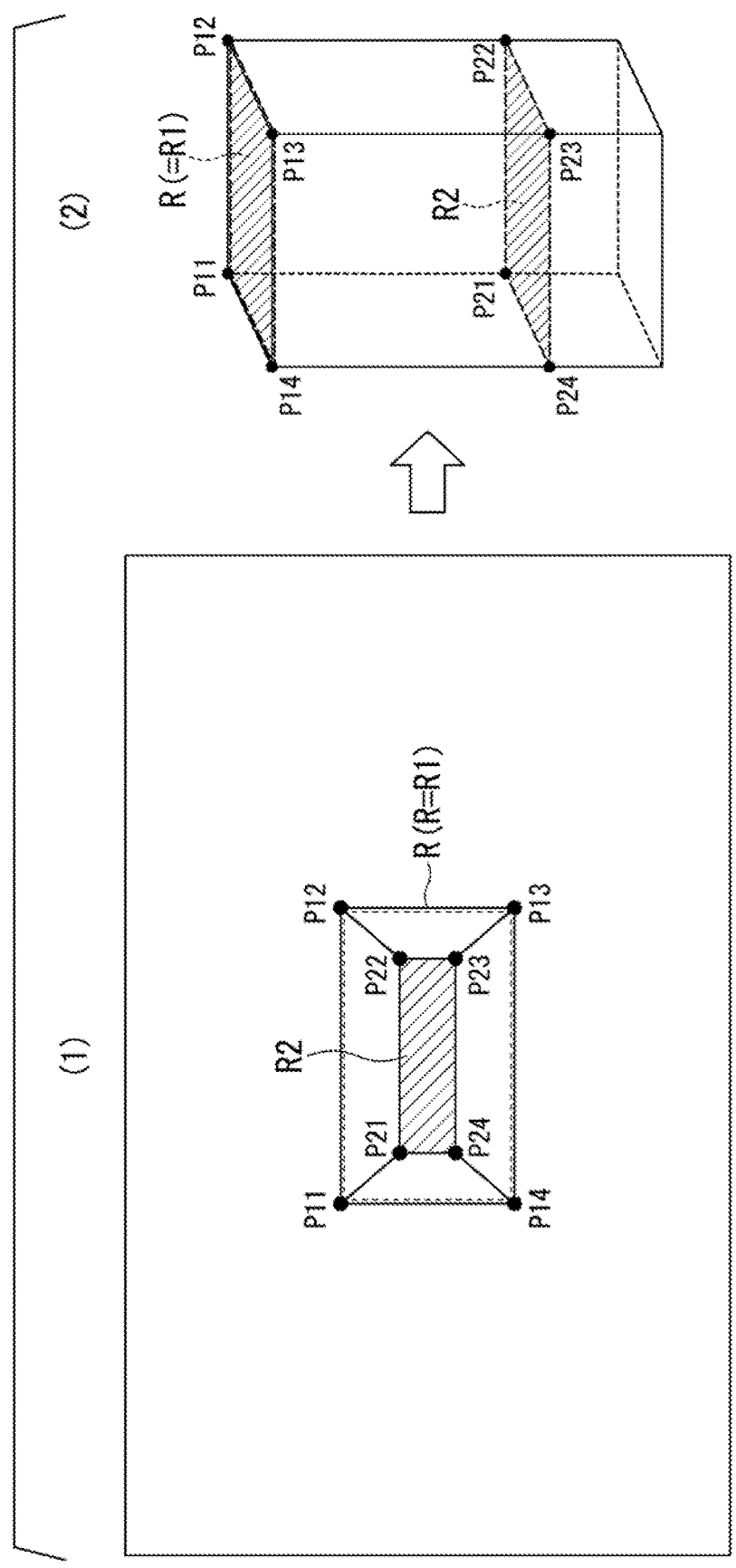
FIG. 11 is a schematic figure showing the relationship between a circumscribed frame R and its specific regions in a first pattern according to the first exemplary embodiment of the present invention.

FIG. 11 is a schematic figure showing the relationship between the circumscribed frame R and its specific regions in the first pattern.

FIG. 11(1) shows the conveying object 4 reflected in the captured image while FIG. 11(2) is a perspective view of the conveying object 4. Herein, a predetermined height h' for the conveying object 4 denotes a height at which the conveying vehicle 3 comes in contact with the conveying object 4. The height at which the conveying vehicle 3 comes in contact with the conveying object 4 is a known value according to standards of the conveying vehicle 3. Now, the circumscribed frame R is identified with respect to the upper face of the conveying object 4 in the captured image. Upon determining the first pattern for positioning the conveying object 4, the measurement unit 14 identifies the circumscribed frame R as the first specific region R1. In the first pattern, the first specific region R1 would be estimated as a rendition of the upper face of the conveying object 4.

The measurement unit 14 acquires from the storage unit or the like the distance information associated with the image information used to identify the circumscribed frame R of the conveying object 4. The measurement unit 14 acquires the height information z (e.g., the height information of the first specific region R1) with respect to the feature points P11, P12, P13, and P14 of the circumscribed frame R in the distance information. The measurement unit 14 identifies the position x1 and the height h' with respect to each of the feature points P11, P12, P13, and P14 of the circumscribed frame R, and therefore the measurement unit 14 substitutes the identified position x1 for x1 of Expression (5), substitutes the identified height h' for h of Expression (5), and substitutes the acquired height z for z of Expression (5), thus calculating the point x2 in the captured image in correspondence with each of the corresponding points P21, P22, P23, and P24 constituting the region of the conveying object 4 at the height h'.

When the circumscribed frame R has a rectangular shape, for example, the measurement unit 14 identifies four vertices of the rectangular shape as the feature points P11, P12, P13, and P14 so as to calculate the corresponding points P21, P22, P23, and P24 at the height h' according to Expression (5). At this time, it is possible to obtain the height of the feature points P11, P12, P13, and P14 from the distance information for each pixel of the circumscribed frame R. In addition, the height of the corresponding points P21, P22, P23, and P24 is the prescribed height h' at which the conveying vehicle 3 comes in contact with the conveying object 4. The measurement unit 14 calculates a region encompassed by the corresponding points P21, P22, P23, and P24 as the second specific region R2 representing the region of the conveying object 4 in the captured image at the height h' at which the conveying vehicle 3 comes in contact with the conveying object 4. In the case of the circumscribed frame R having a shape other than a rectangular shape, the measurement unit 14 may identify a plurality of feature points of the circumscribed frame R so as to calculate a region encompassed by a plurality of corresponding points corresponding to a plurality of feature points as the second specific region R2. The measurement unit 14 outputs to the contact-position identification unit 15 the information of the second specific region R2 representing the region of the conveying object 4 in the captured image at the height h' at which the conveying vehicle 3 comes in contact with the conveying object 4.

(Process of Measurement Unit 14 in Second Pattern)

When the measurement unit 14 determines the second pattern for positioning the conveying object 4, it is assumed that the circumscribed region R may include the upper face and the side face(s) of the conveying object 4. Therefore, the measurement unit 14 identifies the first specific region R1 representing the upper face of the conveying object 4 included in the region of the circumscribed frame R according to the following process.

Figure 12:
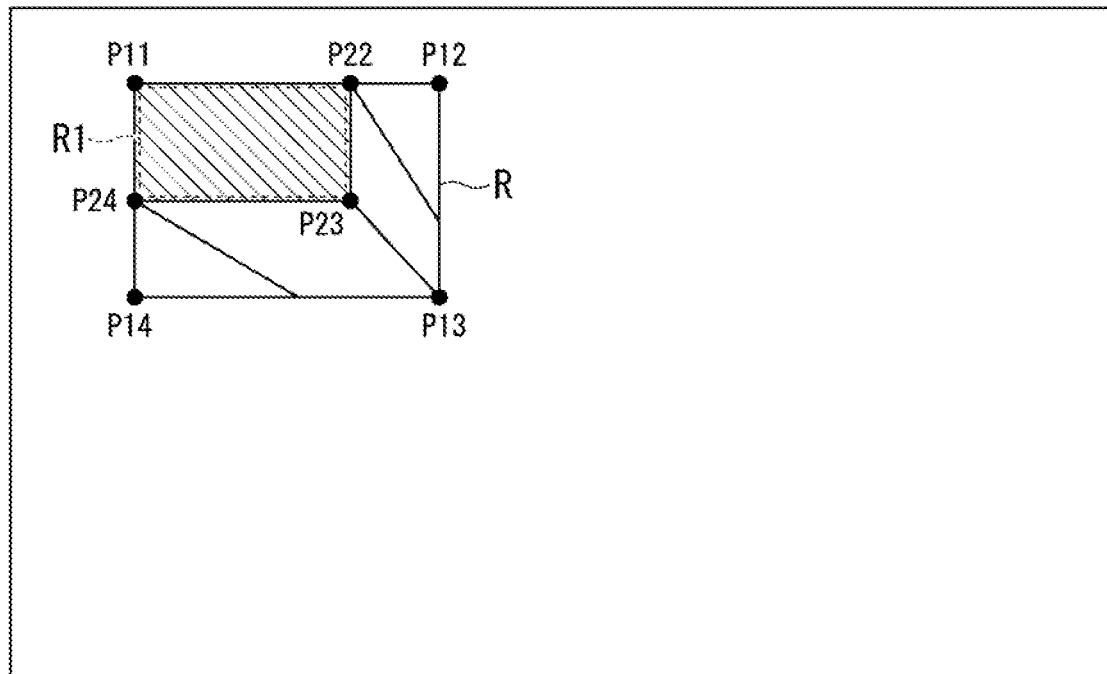
FIG. 12 is a first figure showing the relationship between a circumscribed frame R and its specific region in a second pattern according to the first exemplary embodiment of the present invention.

FIG. 12 is a first figure showing the relationship between the circumscribed frame R and its specific regions in the second pattern.

Specifically, the measurement unit 14 identifies the positions of feature points in the circumscribed frame R according to the predetermined method based on the pattern for positioning the circumscribed frame R. Assuming the circumscribed frame R having a rectangular shape and the second pattern for positioning the circumscribed frame R, for example, four vertices P11, P12, P13, and P14 of the circumscribed frame R will be identified as feature points.

The measurement unit 14 acquires from a distance image and a background image or a storage unit a distance h (i.e., a distance between the height of the feature point P13 in the real space and the height of the sensor 2) representing the height of the feature point P13 which is the closest to the center of the captured image among the feature points P11, P12, P13, and P14 identified in the circumscribed frame R. Herein, the information of pixels other than the regions of the conveying vehicle 3 and the conveying object 4 in the height direction in the distance image and the background image indicates a distance between the height of the floor surface and the height of the sensor 2 in the vertical direction.

The measurement unit 14 acquires from the distance image corresponding to the captured image used to identify the circumscribed frame R the distance z representing a difference between the height of the sensor 2 and the height of the feature point P11, which is the farthest from the center of the captured image among the feature points P11, P12, P13, and P14 identified in the circumscribed frame R. Herein, the distance z represents the height for each point in the upper face of the conveying object 4 including a real-space point corresponding to the feature point P11. The measurement unit 14 calculates an unknown corresponding point P23 (which is equivalent to x1 of Expression (5)) in the captured image by setting x2 of Expression (5) as the feature point P13 identified in the circumscribed frame R of the captured image, setting h of Expression (5) as the height of the feature point P13 in the real space, and setting x of Expression (5) as the height of the unknown corresponding point P23 on the upper face conforming to the horizontal-direction position of the feature point P13 in the real space (which is equivalent to the height of the feature point P11).

In addition, the measurement unit 14 calculates the coordinates of an unillustrated point P20 (which is equivalent to x1 of Expression (5)) having the height z and the same position in the horizontal direction as the feature point P12 in the real space by setting x2 of Expression (5) as the coordinates of the feature point P12 and setting h of Expression (5) as the height of the feature point P12 in the real space, thus calculating the coordinates of the point P22 as an intersecting point between a line segment connected between P20 and P23 and a line segment connected between P11 and P12. In this connection, it is possible to calculate the point P24 as a remaining point of a rectangular shape defined by the points P11, P22, and P23.

The measurement unit 14 identifies the corresponding points as intersecting points (P22, P24) formed between the circumscribed frame and the parallel lines which include the corresponding point P23 in the captured image representing an upper-face point conforming to the horizontal-direction position of a real-space point corresponding to the feature point P13 and which are parallel to the adjacent sides of the circumscribed frame R defined by the feature points P12, P13, and P14 (i.e., the side connected between P12 and P13 and the side connected between P13, and P14). The measurement unit 14 identifies a rectangular region defined by the corresponding points P22, P23, P24 and the feature point P11 representing the upper face as the first specific region R1 which would be presumed as a rendition of the upper face of the conveying object 4 in the second pattern. The measurement unit 14 sets P11, P22, P23, and P24 as feature points (first corresponding points) of the first specific region R1.

Figure 13:
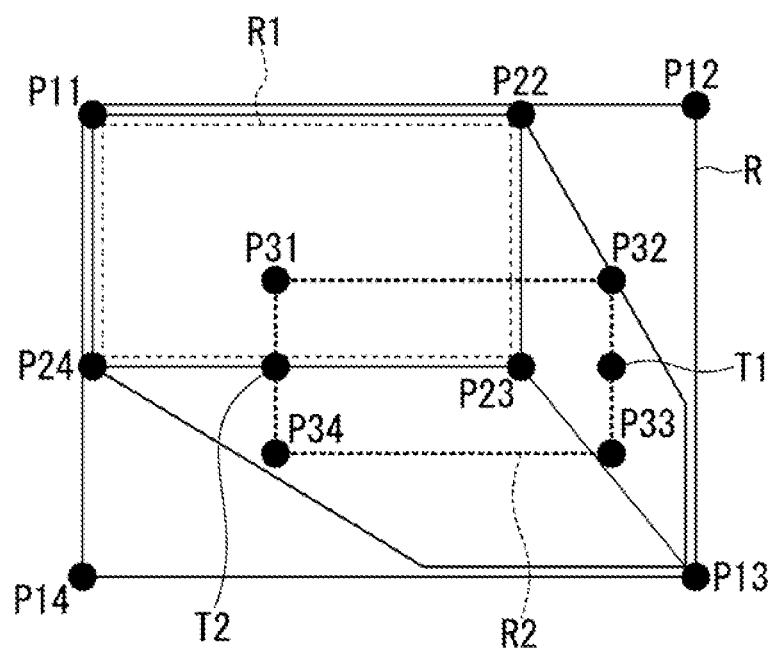
FIG. 13 is a second figure showing the relationship between a circumscribed frame R and its specific regions in a second pattern according to the first exemplary embodiment of the present invention.

FIG. 13 is a second figure showing the relationship between the circumscribed frame R and its specific regions.

The measurement unit 14 identifies the second specific region R2 by calculating the corresponding points P31, P32, P33, and P34 at the height h' at which the conveying vehicle 3 comes in contact with the conveying object 4.

The measurement unit 14 acquires from the storage unit the distance image corresponding to the captured image used to identify the circumscribed frame R of the conveying object 4. The measurement unit 14 acquires the height z of the feature point P11 of the first circumscribed region in the distance image. The measurement unit 14 sets x1 of Expression (5) as the position in the captured image corresponding to the feature point P11 identified in the first specific region R1, sets z of Expression (5) as the height of the feature point representing the upper face of the conveying object 4, and sets h of Expression (5) as the height h' at which the conveying vehicle 3 comes in contact with the conveying object 4, thus inputting those values into Expression (5). Accordingly, it is possible for the measurement unit 14 to calculate the position x2 in the captured image corresponding to the corresponding point P31 conforming to the horizontal-direction position of the feature point P11 in the real space.

Similarly, according to Expression (5), the measurement unit 14 calculates the corresponding points P32, P33, P34 at the height h' at which the conveying vehicle 3 comes in contact with the conveying object 4 in correspondence with the feature points P22, P23, P24. The measurement unit 14 calculates the region defined by the corresponding points P31, P32, P33, and P34 (second corresponding points) as the second specific region R2 representing the region of the conveying object 4 at the height h' at which the conveying vehicle 3 comes in contact with the conveying object 4 in the captured image. In the case of the circumscribed frame R having a shape other than a rectangular shape, the measurement unit 14 may identify a plurality of feature points in the circumscribed frame R so as to calculate a region defined by a plurality of corresponding points corresponding to a plurality of feature points as the second specific region R2. The measurement unit 14 outputs to the contact-position identification unit 15 the information of the second specific region R2 representing the region of the conveying object 4 at the height h' at which the conveying vehicle 3 comes in contact with the conveying object 4 in the captured image.

(First Process of Measurement Unit 14 in Third Pattern)

When the measurement unit 14 determines the third pattern for positioning the circumscribed frame R of the conveying object 4, it is assumed that the circumscribed frame R may include the upper face and the side face(s) of the conveying object 4. Therefore, the measurement unit 14 identifies the first specific region R1 representing the upper face of the conveying object 4 included in the region of the circumscribed frame R according to the following process.

Figure 14:
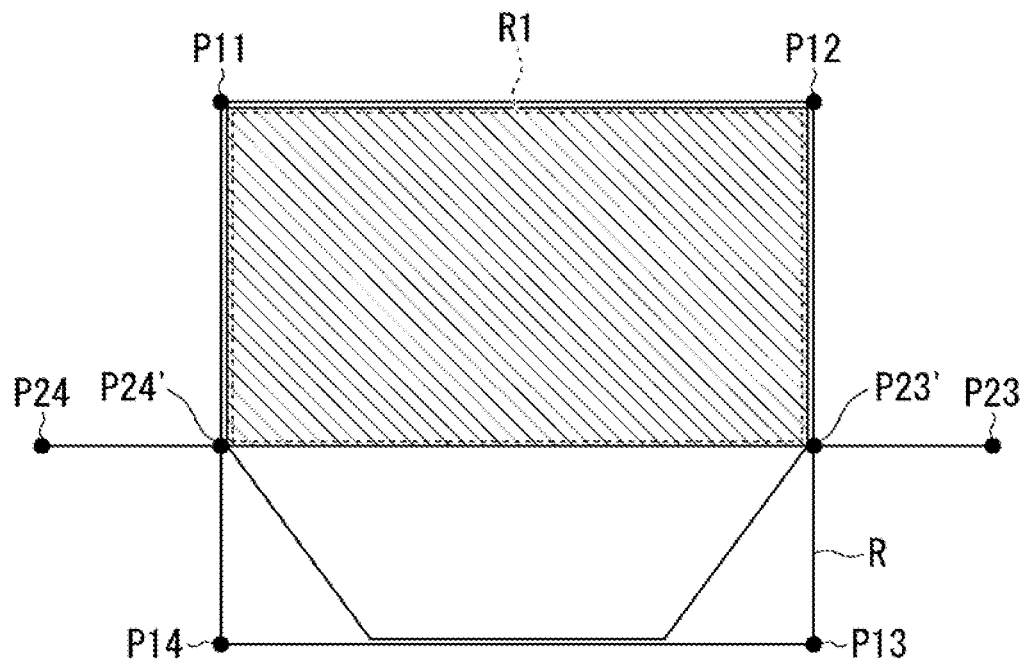
FIG. 14 is a first figure showing the relationship between a circumscribed frame R and its specific region in a third pattern according to the first exemplary embodiment of the present invention.

FIG. 14 is a first figure showing the relationship between the circumscribed frame R and its specific region in the third pattern.

Specifically, the measurement unit 14 identifies the positions of feature points in the circumscribed frame R according to the predetermined method based on the shape of the circumscribed frame R and the position of the circumscribed frame R. Assuming the circumscribed region R having a rectangular shape and the third pattern for positioning the circumscribed frame R, for example, it is possible to identify vertices P11, P12, P13 and P14 of the circumscribed frame R as feature points.

The measurement unit 14 acquires from the distance image and the background image or the storage unit the distance h representing the height of the feature point P13 or P14, which is the closest to the center of the captured image among the feature points P11, P12, P13, and P14 identified in the circumscribed frame R, (i.e., the distance between the height of the sensor 2 and the height of the feature point P13 or P14 in the real space). Herein, the height-direction information of pixels other than the regions of the conveying vehicle 3 and the conveying object 4 in the distance image and the background image represents the distance between the height of the sensor 2 and the height of the floor surface in the vertical direction.

The measurement unit 14 acquires from the distance information corresponding to the captured image used to identify the circumscribed frame R the distance z representing a difference between the height of the sensor 2 and the height of the feature point P11 or P12 which is the farthest from the center of the captured image among the feature points P11, P12, P13, and P14 identified in the circumscribed frame R. Herein, the distance z is the information representing the height for each point on the upper face of the conveying object 4 including a real-space point corresponding to the feature point P11 or P12. The measurement unit 14 calculates an unknown corresponding point P23 in the captured image (which is equivalent to x1 of Expression (5)) by setting x2 of Expression (5) as the feature point P13 identified in the circumscribed frame R in the captured image, setting h of Expression (5) as the height of the feature point P13 in the real space, and setting z of Expression (5) as the height of the unknown corresponding point P23 on the upper face conforming to the horizontal-direction position of the feature point P13 in the real space (which is equivalent to the height of the feature point P11). In addition, the measurement unit 14 calculates an unknown corresponding point P24 in the captured image (which is equivalent to x1 of Expression (5)) by setting x2 of Expression (5) as the feature point P14 identified in the circumscribed frame R in the captured image, setting h of Expression (5) as the height of the feature pint P14 in the real space, and setting z of Expression (5) as the height of the unknown corresponding point P24 on the upper face conforming to the horizontal-direction position of the feature point P14 in the real space (which is equivalent to the height of the feature point P11).

The measurement unit 14 identifies corresponding points P23' and P24', at which a line segment between the corresponding points P23 and P24 crosses the circumscribed frame R, as corresponding points in the captured image in correspondence with points on the upper face of the conveying object 4. The measurement unit 14 identifies a rectangular region defined by the corresponding points P23', P24' and the feature points P11, P12 representing the upper face as the first specific region R1 which can be presumed as a rendition of the upper face of the conveying object 4 in the third pattern. The measurement unit 14 sets those points P11, P12, P23', P24' as the feature points (first corresponding points) of the first specific region R1.

The measurement unit 14 identifies the second specific region R2 by calculating the corresponding points P31, P32, P33, P34 at the height h' at which the conveying vehicle 3 comes in contact with the conveying object 4.

The measurement unit 14 acquires from the storage unit the distance image corresponding to the captured image used to identify the circumscribed frame R of the conveying object 4. The measurement unit 14 acquires the height z of the feature point P11 of the first specific region R1 in the distance image. The measurement unit 14 sets x1 of Expression (5) as the position in the captured image corresponding to the feature point P11 identified in the first specific region R1, sets z of Expression (5) as the height of the feature point P11 representing the upper face of the conveying object 4, and sets h of Expression (5) as the height h' at which the conveying vehicle 3 comes in contact with the conveying object 4, thus inputting those values into Expression (5). Thus, it is possible for the measurement unit 14 to calculate the position x2 in the captured image in correspondence with the corresponding point P31 conforming to the horizontal-direction position of the feature point P11 in the real space.

Similarly, according to Expression (5), the measurement unit 14 calculates the corresponding points P32, P33, P34 at the height h' at which the conveying vehicle 3 comes in contact with the conveying object 4 in correspondence with the feature point P12, P23', P24'. The measurement unit 14 calculates a region defined by the corresponding points P31, P32, P33, P34 (second corresponding points) as the second specific region R2 representing the region of the conveying object 4 in the captured image at the height h' at which the conveying vehicle 3 comes in contact with the conveying object 4. In the case of the circumscribed frame R having a shape other than a rectangular shape, the measurement unit 14 may identify a plurality of feature points of the circumscribed frame R so as to calculate a region defined by a plurality of corresponding points corresponding to a plurality of feature points as the second specific region R2. The measurement unit 14 outputs to the contact-position identification unit 15 the information of the second specific region R2 representing the region of the conveying object 4 in the captured image at the height h' at which the conveying vehicle 3 comes in contact with the conveying object 4.

(Second Process of Measurement Unit 14 in Third Pattern)

When the measurement unit 14 determines the third pattern for positioning the circumscribed frame R of the conveying object 4, it is assumed that the circumscribed frame R may include the upper face and the side face(s) of the conveying object 4. Therefore, the measurement unit 14 identifies the first specific region R1 representing the upper face of the conveying object 4 included in the region indicated by the circumscribed frame R.

Figure 15:
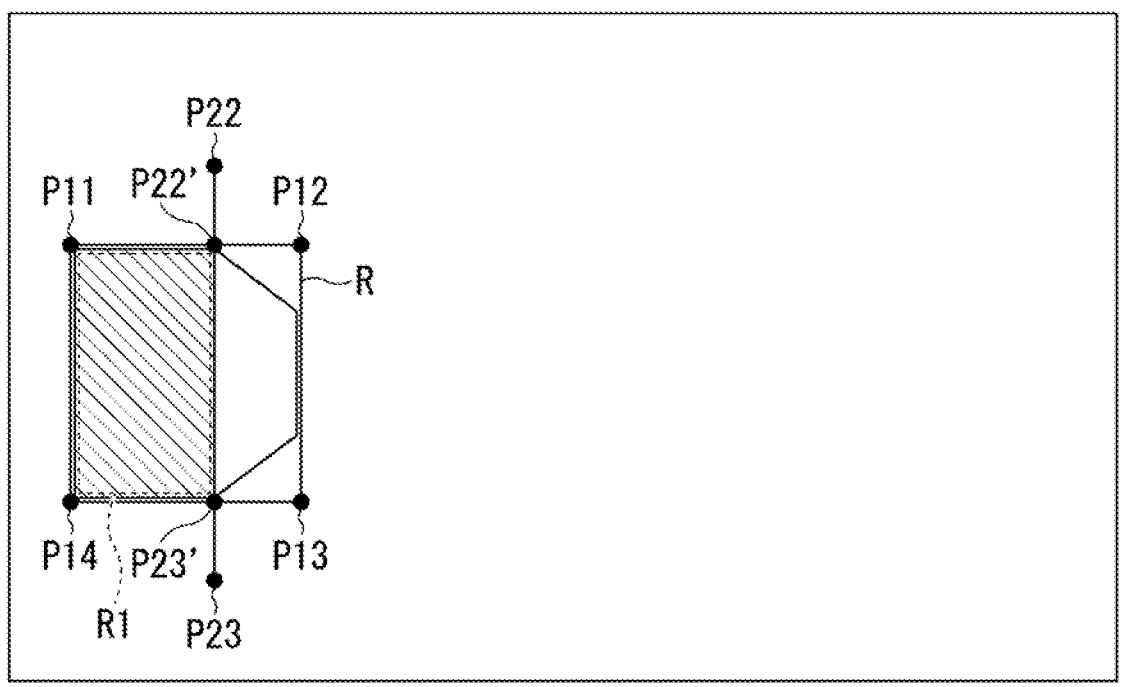
FIG. 15 is a second figure showing the relationship between a circumscribed frame R and its specific region in the third pattern according to the first exemplary embodiment of the present invention.

FIG. 15 is a second figure showing the relationship between the circumscribed frame R and its specific region in the third pattern.

Specifically, the measurement unit 14 identifies the positions of feature points of the circumscribed frame R according to the predetermined method based on the shape of the circumscribed frame R and the position of the circumscribed frame R. Assuming the circumscribed frame R having a rectangular shape and the third pattern for positioning the circumscribed frame R, for example, it is possible to identify four vertices P11, P12, P13, P14 of the circumscribed frame R as its feature points.

The measurement unit 14 acquires from the distance image and the background image or the storage unit the distance h representing the height of the feature point P12 or P13 which is the closest to the center of the captured image among the feature points P11, P12, P13, P14 identified in the circumscribed frame R (i.e., the distance between the height of the sensor 2 and the height of the feature point P12 or P13 in the real space). Herein, the height-direction information representing pixels other than the regions of the conveying vehicle 3 and the conveying object 4 in the distance image and the background image indicates the distance between the height of the floor surface and the height of the sensor 2 in the vertical direction.

The measurement unit 14 acquires from the distance image corresponding to the captured image used to identify the circumscribed frame R the distance z representing a difference between the height of the sensor 2 and the height of the feature points P11 or P14 which is the farthest from the center of the captured image among the feature points P11, P12, P13, P14 identified in the circumscribed frame R. Herein, the distance z is the information representing the height for each point on the upper face of the conveying object 4 including a real-space point corresponding to the feature point P11 or P14. The measurement unit 14 calculates an unknown corresponding point P22 in the captured image (which is equivalent to x1 of Expression (5)) by setting x2 of Expression (5) as the feature point P12 identified in the circumscribed frame R in the captured image, setting h of Expression (5) as the height of the feature point P12 in the real space, setting z of Expression (5) as the height of the unknown corresponding point P24 on the upper face conforming to the horizontal-direction position of the feature point P14 in the real space (which is equivalent to the height of the feature point P11). In addition, the measurement unit 14 calculates an unknown corresponding point P23 in the captured image (which is equivalent to x1 of Expression (5)) by setting x2 of Expression (5) as the feature point P13 identified in the circumscribed frame R in the captured image, setting h of Expression (5) as the height of the feature point P13 in the real space, and setting z of Expression (5) as the height of the unknown corresponding point P23 on the upper face conforming to the horizontal-direction position of the feature point P13 in the real space (which is equivalent to the height of the feature point P11).

The measurement unit 14 identifies corresponding points P22', P23', at which the line segment defined between the corresponding points P22 and P23 crosses the circumscribed frame R, as corresponding points in the captured image corresponding to points on the upper face of the conveying object 4. The measurement unit 14 identifies a rectangular region defined by the corresponding points P22', P23' and the feature points P11, P14 representing the upper face as the first specific region R1 which can be presumed as a rendition of the upper face of the conveying object 4 in the third pattern. The measurement unit 14 sets P11, P22', P23', P14 as feature points of the first specific region R1 (first corresponding points).

The measurement unit 14 acquires from the storage unit the distance image corresponding to the captured image used to identify the circumscribed frame R of the conveying object 4. The measurement unit 14 acquires the height z of the feature point P11 of the first specific region R1 in the distance image. The measurement unit 14 sets x1 of Expression (5) as the position in the captured image corresponding to the feature point P11 specified in the first specific region R1, sets z of Expression (5) as the height of the feature point P11 representing the upper face of the conveying object 4, and sets h of Expression (5) as the height at which the conveying vehicle 3 comes in contact with the conveying object 4, thus inputting those values into Expression (5). Accordingly, it is possible for the measurement unit 14 to calculate the position x2 in the captured image in correspondence with the corresponding point P31 conforming to the horizontal-direction position of the feature point P11 in the real space.

Similarly, according to Expression (5), the measurement unit 14 calculates the corresponding points P32, P33, P34 at the height h' at which the conveying vehicle 3 comes in contact with the conveying object 4 in correspondence with the feature points P22', P23', P14. The measurement unit 14 calculates the region defined by the corresponding points P31, P32, P33, P34 (second corresponding points) as the second specific region R2 representing the region of the conveying object 4 in the captured image at the height h' at which the conveying vehicle 3 comes in contact with the conveying object 4. In the case of the circumscribed frame R having a shape other than a rectangular shape, the measurement unit 14 may identify a plurality of feature points of the circumscribed frame R so as to calculate a region defined by a plurality of corresponding points corresponding to a plurality of feature points as the second specific region R2. The measurement unit 14 outputs to the contact-position identification unit 15 the information of the second specific region R2 representing the region of the conveying object 4 in the captured image at the height h' at which the conveying vehicle 3 comes in contact with the conveying object 4.

The aforementioned process of the measurement unit 14 for the first specific region R1 according to the second pattern and the third pattern would be one manner of identifying a first specific region representing a region of a target object conforming to the height of an upper face among multiple specific regions based on four first corresponding points upon calculating four first corresponding points according to the relationship between four feature points of a circumscribed frame R (e.g., a target-object-encompassing region) and the height of four feature points as well as the relationship between two or three corresponding points of a target object, which conform to horizontal-direction coordinates (or the horizontal-direction position) of feature points of the circumscribed frame R but have different coordinates in height, and the height of the upper face.

In addition, the aforementioned process of the measurement unit 14 for the second specific region R2 according to the second pattern and the third pattern would be one manner of identifying a second specific region representing a region of a target object conforming to the height of a contact position among multiple specific regions based on four second corresponding points upon calculating four second corresponding points at the height of a contact position according to the relationship between four first corresponding points of a first specific region and the height of four first corresponding points as well as the relationship between four second corresponding points, which conform to horizontal coordinates of first corresponding points at the height of the contact position of the target object serving as a second predetermined height and whose coordinates in height represent coordinates of the contact position in height, and the height of the contact position.

Second Exemplary Embodiment

The foregoing exemplary embodiment refers to an example of the conveying object 4 serving as a cart or a bogie, wherein the foregoing exemplary embodiment is designed to identify the contact position of the conveying object 4 placed on a traveling road surface of the conveying vehicle 3, thus controlling the conveying vehicle 3 according to the contact position. However, the aforementioned technology can be applied to a control system using another type of the conveying object 4 and configured to identify the contact position of another conveying object and to thereby output the contact position to a predetermined device.

Figure 16:
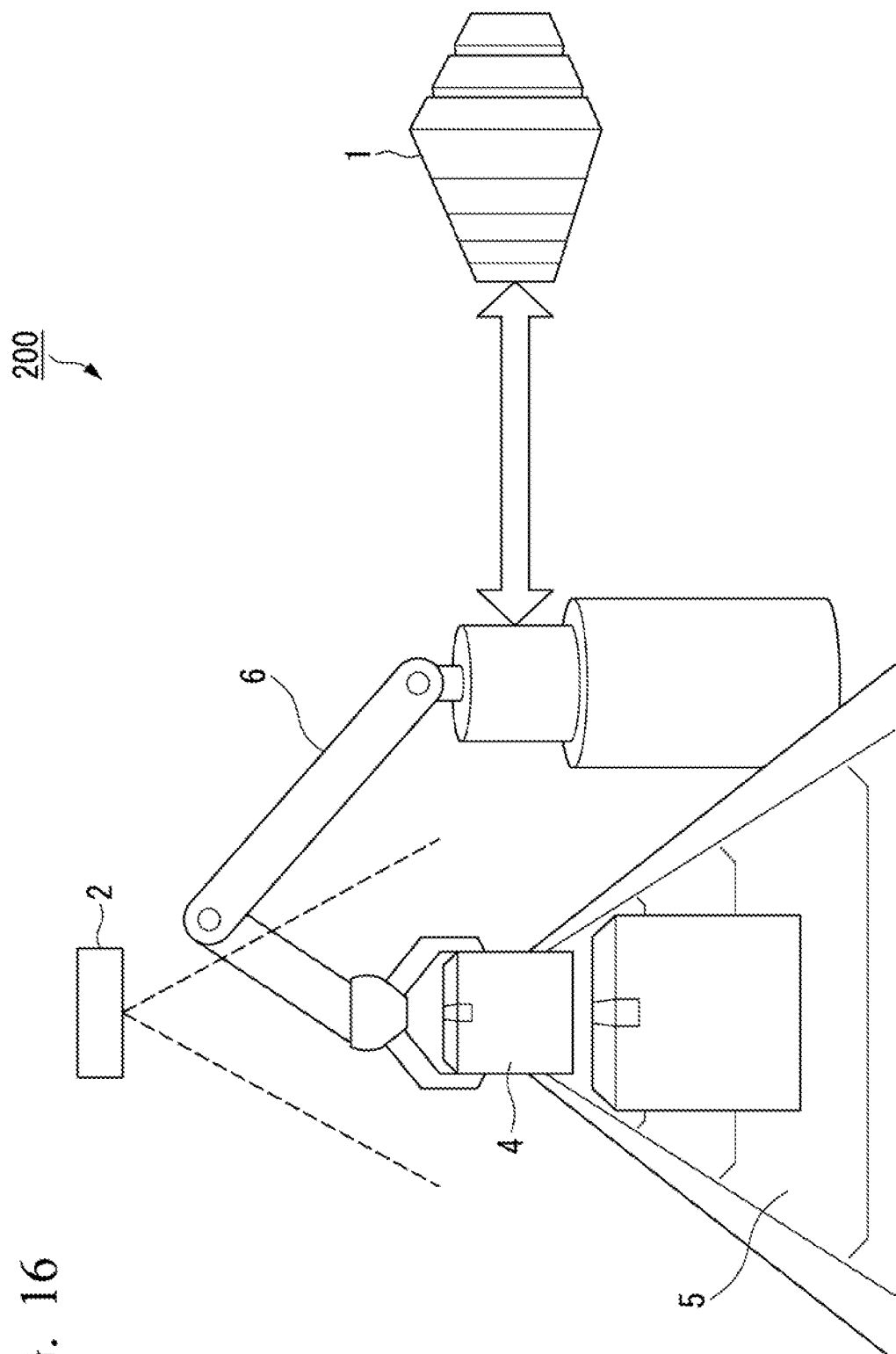
FIG. 16 is a schematic configuration diagram of a control system equipped with a control device according to the second exemplary embodiment of the present invention.

FIG. 16 is a schematic configuration diagram of a control system equipped with a control device according to the second exemplary embodiment.

When the conveying object 4 is mounted on a belt conveyer 5 installed in the control system and moving in a predetermined direction, for example, a control device 1 included in the control system may identify the contact position with respect to the conveying object 4 so as to control a robot 6 installed in the control system according to the contact position of the conveying object 4.

In this case, similar to the first exemplary embodiment, the control device 1 is configured to identify a circumscribed frame R (e.g., a target-object-encompassing region) representing a region in which pixel information including the conveying object 4 has been changed in the image information including the conveying object 4 according to any change between the image information precluding the conveying object 4, which is acquired from the sensor 2, and the image information including the conveying object 4. Similar to the first exemplary embodiment, the control device 1 is configured to identify the circumscribed frame R of the conveying object 4, the first specific region R1 (e.g., an upper-face region), and the second specific region R2 (e.g., a region of the contact position in height), thus identifying the contact position based on the second specific region R2. In the case of the second specific region R2 having a rectangular shape, for example, it is possible to identify the contact position of the conveying object 4 with the robot 6 as the center for each of two sides upon identifying the moving direction of the belt conveyer 5 and two opposite sides having a small angle with each side of a rectangular shape.

The aforementioned exemplary embodiment may identify the contact position of the conveying object 4 but can identify the contact position of another target object. When another target object is a welding object or an ornamenting object, or example, the control device 1 may identify the contact position of a welding object (or a welding position) or the contact position of an ornamenting object (or an ornamenting position).

It is possible to realize a physical measurement system including a measurement device having the same function as the control device 1 according to each exemplary embodiment. The physical measurement system includes a measurement device which can communicate with the sensor 2 configured to acquire the height information and the image information of a target object. Similar to each exemplary embodiment, according to any change between the image information precluding the target object and the image information including the target object, the measurement device may identify a target-object-encompassing region representing a region in which pixel information including the target object has been changed in the image information including the target object, thus identifying a specific region at the predetermined height of the target object included in the target-object-encompassing region based on the target-object-encompassing region and the height information.

Third Exemplary Embodiment

Figure 17:
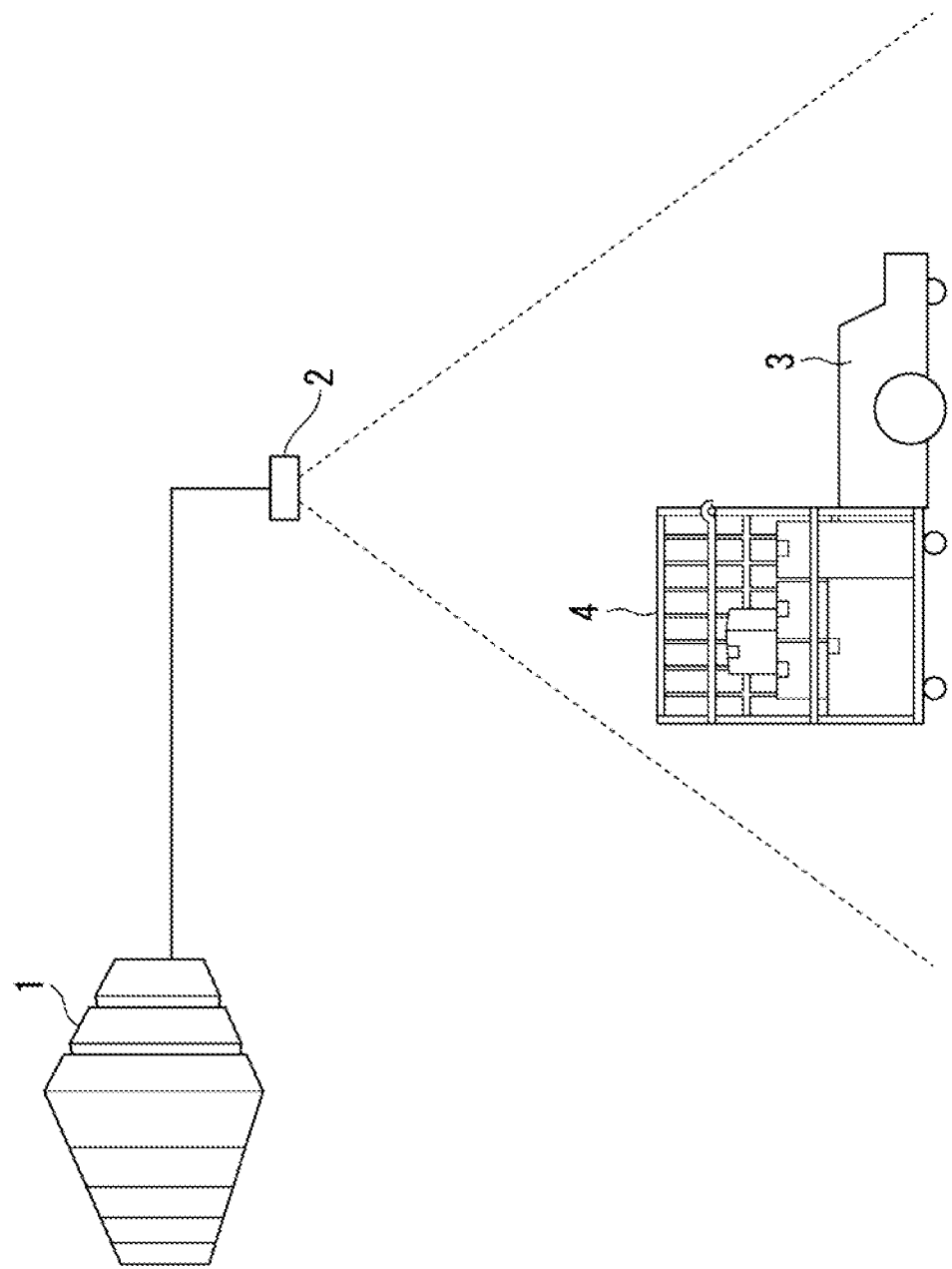
FIG. 17 is a schematic configuration diagram of a conveyance system according to the third exemplary embodiment of the present invention.

FIG. 17 is a schematic configuration diagram of a conveyance system according to the third exemplary embodiment.

With reference to FIG. 17, the conveyance system includes the control device 1, the sensor 2, the conveying vehicle 3, and the conveying object 4. The control device 1 can communicate with the sensor 2 and the conveying vehicle 3 through networks.

Figure 18:
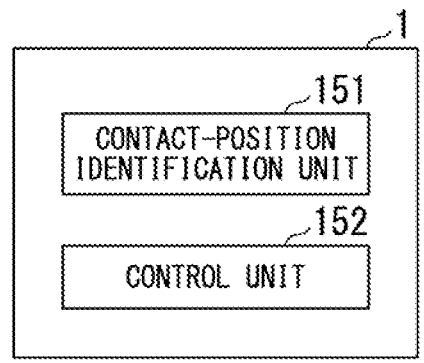
FIG. 18 is a schematic configuration diagram of a control device according to the third exemplary embodiment of the present invention.

FIG. 18 is a schematic configuration diagram of the control device according to the third exemplary embodiment.

The control device 1 is configured to control the conveying vehicle 3. For example, the control device 1 is an information processing device such as a computer. The control device 1 can be embodied via cloud computing. The control device 1 includes a contact-position identification unit 151 and a control unit 152.

The contact-position identification unit 151 is configured to identify the contact position at which the conveying vehicle 3 comes in contact with the conveying object 4 when conveying the conveying object 4 based on the information relating to the conveying object 4.

The control unit 152 is configured to control the conveying vehicle 3 based on the contact position of the conveying object 4.

The sensor 2 is configured to acquire the information relating to the conveying object 4.

Figure 19:
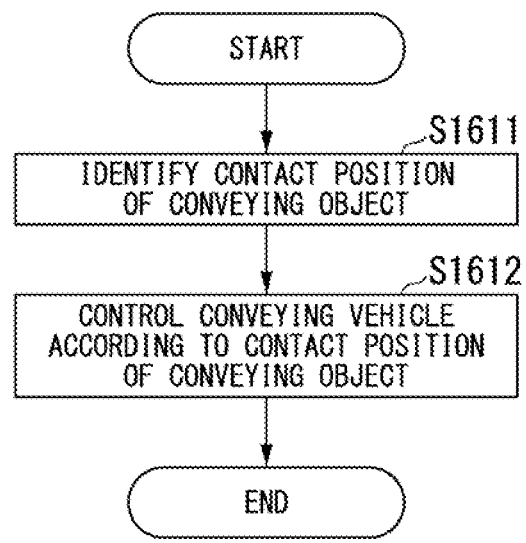
FIG. 19 is a flowchart showing a flow of processes implemented by the control device according to the third exemplary embodiment of the present invention.

FIG. 19 is a flowchart showing a flow of processes implemented by the control device 1 according to the third exemplary embodiment.

The contact-position identification unit 151 identifies the contact position at which the conveying vehicle 3 comes in contact with the conveying object 4 based on the information relating to the conveying object 4 (step S1611).

The control unit 152 controls the conveying vehicle 3 based on the contact position of the conveying object 4 (step S1612).

The aforementioned control device 1 includes a computer system therein. The aforementioned processes are stored on computer-readable storage media in the form of programs, wherein a computer may read and execute programs to achieve the aforementioned processes. Herein, the computer-readable storage media refer to magnetic disks, magneto-optical disks, CD-ROM, DVD-ROM, semiconductor memory and the like. In addition, it is possible to deliver computer programs to a computer through communication lines, and therefore the computer receiving programs delivered thereto may execute programs.

The aforementioned programs may achieve some of the foregoing functions. Alternatively, the aforementioned programs may be so-called differential files (or differential programs) which can achieve the foregoing functions when combined with pre-recorded programs of the computer system.

Some of or the entirety of the foregoing exemplary embodiments can be described as the following appendixes, which are not restrictive.

Appendix 1

A conveying system including a conveying vehicle configured to convey a conveying object, a sensor configured to acquire the information relating to the conveying object, and a control device configured to control the conveying vehicle is designed to identify a contact position at which the convening vehicle comes in contact with the conveying object when conveying the conveying object based on the information relating to the conveying object and to control the conveying vehicle according to the contact position.

Appendix 2

In the conveyance system according to Appendix 1, the information relating to the conveying object includes image information capturing the conveying object and height information of the conveying object.

Appendix 3

In the conveyance system according to Appendix 1, the control device is configured to control the conveying vehicle according to the contact position representing a center of the side face of the conveying object.

Appendix 4

In the conveyance system according to Appendix 2, the sensor is configured to measure the image information and distance information for each position of the conveying object, and therefore the control device is configured to identify the contact position based on the image information and the distance information.

Appendix 5

5. In the conveyance system according to any one of Appendix 1 through Appendix 4, the control device is configured to control a plurality of conveying vehicles each configured to convey the conveying object according to the contact position.

Appendix 6

In the conveyance system according to Appendix 5, the control device is configured to identify the side face of the conveying object to be sandwiched by a plurality of conveying vehicles, thus controlling a plurality of conveying vehicles each according to the contact position on the side face.

Appendix 7

A control device configured to communicate with a conveying vehicle configured to convey a conveying object and a sensor configured to acquire the information relating to the conveying object, to identify a contact position at which the conveying vehicle comes in contact with the conveying object when conveying the conveying object based on the information relating to the conveying object, and to control the conveying vehicle according to the contact position.

Appendix 8

In the control device according to Appendix 7, the information relating to the conveying object includes the image information capturing the conveying object and height information of the conveying object.

Appendix 9

In the control device according to Appendix 7, the control device is configured to control the conveying vehicle according to the contact position representing a center of the side face of the conveying object.

Appendix 10

In the control device according to Appendix 8, the sensor is configured to measure the image information and distance information for each position of the conveying object, and therefore the contact position is identified based on the image information and the distance information.

Appendix 11

In the control device according to any one of Appendix 7 through Appendix 10, the control device is configured to control a plurality of conveying vehicles each configured to convey the conveying object according to the contact position.

Appendix 12

In the control device according to Appendix 11, the control device is configured to identify the side face of the conveying object to be sandwiched by a plurality of conveying vehicles, thus controlling a plurality of conveying vehicles each according to the contact position on the side face.

Appendix 13

A control method comprising: communicating with a conveying vehicle configured to convey a conveying object and a sensor configured to acquire information relating to the conveying object; identifying a contact position at which the conveying vehicle comes in contact with the conveying object when conveying the conveying object based on the information relating to the conveying object; and controlling the conveying vehicle according to the contact position.

Appendix 14

In the control method device according to Appendix 13, the information relating to the conveying object includes image information capturing the conveying object and height information of the conveying object.

Appendix 15

In the control method according to Appendix 13, the conveying vehicle is controlled according to the contact position representing a center of the side face of the conveying object.

Appendix 16

In the control method according to Appendix 14, the sensor is configured to measure the image information and distance information for each position of the conveying object, thus identifying the contact position based on the image information and the distance information.

Appendix 17

In the control method according to any one of Appendix 13 through Appendix 16, a plurality of conveying vehicles each configured to convey the conveying object are each controlled according to the contact position.

Appendix 18

In the control method according to Appendix 17, the side face of the conveying object to be sandwiched by a plurality of conveying vehicles is identified to control a plurality of conveying vehicles each according to the contact position on the side face.

Appendix 19

A control system including a robot to come in contact with a target object, a sensor configured to acquire the information relating to the target object, and a control device configured to control the robot is designed to identify a contact position at which the robot comes in contact with the target object based on the information relating to the target object and to control the robot according to the contact position.

Appendix 20

A control device is configured to communicate with a robot to come in contact with a target object and a sensor configured to acquire the information relating to the target object, to identify a contact position at which the robot comes in contact with the target object based on the information relating to the target object, and to control the robot according to the target position.

Appendix 21

A control method is adapted to a control device configured to communicate with a robot to come in contact with a target object and a sensor configured to acquire the information relating to the target object, which may identify a contact position at which the robot comes in contact with the conveying object based on the information relating to the target object, and control the robot according to the contact position.

Appendix 22

A physical measurement system includes a measurement device configured to communicate with a sensor configured to acquire the height information of a target object and the image information of a target object, wherein the measurement device is configured to identify a target-object-encompassing region representing a region in which the pixel information including the target object has been changed in the image information including the target object according to any change between the image information precluding the target object and the image information including the target object, thus identifying a specific region at a predetermined height of the target object in the target-object-encompassing region based on the target-object-encompassing region and the height information.

Appendix 23

In the physical measurement system according to Appendix 22, the measurement device is configured to calculate the corresponding points at the predetermined height according to the feature points in the target-object-encompassing region and the height of the feature points as well as the relationship between the corresponding points at the predetermined height conforming to the horizontal positions of the feature points and the height information representing the predetermined height, thus identifying the specific region based on the corresponding points.

Appendix 24

In the physical measurement system according to Appendix 22, the measurement device is configured to calculate a plurality of corresponding points at the predetermined height according to the relationship between a plurality of feature points in the target-object-encompassing region and the height information for a plurality of feature points as well as the relationship between a plurality of corresponding points at the predetermined height conforming to the horizontal positions of the feature points and the height information representing the predetermined height, thus identifying the specific region based on a plurality of corresponding points.

Appendix 25

In the physical measurement system according to any one of Appendix 22 through Appendix 24, the measurement device is configured to calculate a plurality of first corresponding points at the height of the upper face according to the relationship between a plurality of feature points in the target-object-encompassing region and the height information for a plurality of feature points as well as the relationship between a plurality of first corresponding points conforming to the horizontal positions of the feature points at the height of the upper face of the target object serving as a first predetermined height and the height information representing the height of the upper face, thus identifying a first specific region representing a region of the target object at the height of the upper face among multiple specific regions according to a plurality of first corresponding points. In addition, the measurement device is configured to calculate a plurality of second corresponding points at the height of the contact position according to the relationship between a plurality of first corresponding points in the first specific region and the height information for a plurality of first corresponding points as well as the relationship between a plurality of second corresponding points conforming to the horizontal positions of the first corresponding points at the height of the contact position of the target object serving as a second predetermined height, thus identifying a second specific region representing a region of the target object conforming to the height of the contact position among multiple specific regions according to a plurality of second corresponding points.

Appendix 26

The physical measurement system according to any one of Appendix 22 through Appendix 25 further includes a size calculation unit configured to calculate the size of the measurement device based on the specific region.

Appendix 27

In the physical measurement system according to any one of Appendix 22 through Appendix 26, the information relating to the specific region is output to a control device configured to control conveyance of the conveying object according to the specific region.

Appendix 28

A measurement device is configured to communicate with a sensor configured to acquire the height information of a target object and the image information of a target object, to identify a target-object-encompassing region representing a region in which the pixel information including the target object has been changed in the image information including the target object according to any change between the image information precluding the target object and the image information including the target object, and to identify a specific region for the target object at a predetermined height included in the target-object-encompassing region based on the target-object-encompassing region and the height information.

Appendix 29

A measurement device communicates with a sensor configured to acquire the height information of a target object and the image information of a target object, wherein the measurement device is configured to identify a target-object-encompassing region representing a region in which the pixel information including the target object has been changed in the image information including the target object according to any change between the image information precluding the target object and the image information including the target object, thus identifying a specific region at a predetermined height of the target object included in the target-object-encompassing region based on the target-object-encompassing region and the height information.

REFERENCE SIGNS LIST

1 . . . control device (measurement device)
2 . . . sensor
3 . . . conveying vehicle
4 . . . conveying object (target object)
5 . . . belt conveyer
6 . . . robot
11 . . . image-information acquisition unit
12 . . . distance-information acquisition unit
13 . . . difference detection unit
14 . . . measurement unit
15 . . . contact-position identification unit
16 . . . conveyance control unit
17 . . . display unit
100 . . . conveyance system (physical measurement system)
151 . . . contact-position identification unit
152 . . . control unit
200 . . . control system (physical measurement system)

What is claimed is:

1. A conveyance system comprising a plurality of conveying vehicles configured to convey a conveying object and a sensor configured to acquire information relating to the conveying object, the conveyance system implementing:
identifying a contact position at which the plurality of conveying vehicles comes in contact with the conveying object when conveying the conveying object based on the information relating to the conveying object;
controlling the plurality of conveying vehicles according to the contact position; and
identifying a side face of the conveying object to be sandwiched by the plurality of conveying vehicles,
wherein the controlling the plurality of conveying vehicles according to the contact position includes controlling the plurality of conveying vehicles each according to the contact position on the side face.

2. The conveyance system according to claim 1, wherein the information relating to the conveying object includes image information capturing the conveying object and height information of the conveying object.

3. The conveyance system according to claim 1, wherein the controlling the plurality of conveying vehicles controls the conveying vehicle according to the contact position representing a center of a side face of the conveying object.

4. The conveyance system according to claim 2, wherein the sensor is configured to measure the image information and distance information for each position of the conveying object, and wherein the controlling the plurality of conveying vehicles identifies the contact position based on the image information and the distance information.

5. A control device comprising:
a processor and a memory configured to store instructions, the processor executing the instructions to:
communicate with a plurality of conveying vehicles configured to convey a conveying object and a sensor configured to acquire information relating to the conveying object;
identify a contact position at which the plurality of conveying vehicles comes in contact with the conveying object when conveying the conveying object based on the information relating to the conveying object;
control the plurality of conveying vehicles according to the contact position; and
identify a side face of the conveying object to be sandwiched by the plurality of conveying vehicles,
wherein the controlling the plurality of conveying vehicles according to the contact position includes controlling the plurality of conveying vehicles each according to the contact position on the side face.

6. The control device according to claim 5, wherein the information relating to the conveying object includes image information capturing the conveying object and height information of the conveying object.

7. The control device according to claim 5, wherein the processor is configured to control the conveying vehicle according to the contact position representing a center of a side face of the conveying object.

8. The control device according to claim 6, wherein the sensor is configured to measure the image information and distance information for each position of the conveying object, and wherein the processor is configured to identify the contact position based on the image information and the distance information.

9. A control method comprising:
communicating with a plurality of conveying vehicles configured to convey a conveying object and a sensor configured to acquire information relating to the conveying object;
identifying a contact position at which the plurality of conveying vehicles comes in contact with the conveying object when conveying the conveying object based on the information relating to the conveying object;
controlling the plurality of conveying vehicles according to the contact position; and
identifying a side face of the conveying object to be sandwiched by the plurality of conveying vehicles,
wherein the controlling the plurality of conveying vehicles according to the contact position includes controlling the plurality of conveying vehicles each according to the contact position on the side face.

10. The control method device according to claim 9, wherein the information relating to the conveying object includes image information capturing the conveying object and height information of the conveying object.

11. The control method according to claim 9, comprising: controlling the conveying vehicle according to the contact position representing a center of a side face of the conveying object.

12. The control method according to claim 10, wherein the sensor is configured to measure the image information and distance information for each position of the conveying object, and wherein the control method further comprises thus-identifying the contact position based on the image information and the distance information.

* * * * *